United States Patent [19]
Iino et al.

[11] Patent Number: 5,551,010
[45] Date of Patent: Aug. 27, 1996

[54] ARITHMETIC OPERATION UNIT AND MEMORY ACCESSING DEVICE FOR ACCESSING PRIMARY AND SECONDARY CACHE MEMORIES INDEPENDENTLY OF A CPU

[75] Inventors: Hideyuki Iino; Hiromasa Takahashi, both of Kawasaki, Japan

[73] Assignee: Fujitsu Limited, Kawasaki, Japan

[21] Appl. No.: 978,882

[22] Filed: Nov. 19, 1992

[30] Foreign Application Priority Data

Nov. 19, 1991 [JP] Japan .................... 3-303578

[51] Int. Cl.⁶ .................... G06F 13/36; G06F 13/00; G06F 15/347; G06F 12/00
[52] U.S. Cl. .................... 395/496; 395/287; 395/294; 395/308; 395/449; 395/467; 395/478; 395/403; 395/800; 364/231.8; 364/242.91; 364/242.92; 364/243.41; 364/935.41; 364/935.46; 364/948.34; 364/961.3; 364/964.26; 364/964.32; 364/DIG. 1; 364/DIG. 2; 364/931.51; 364/232.21
[58] Field of Search .................... 395/425, 325, 395/800, 403, 294, 292, 287, 300, 301, 308, 445, 446, 449, 450, 452, 457, 467, 468, 477, 478, 485, 494, 495, 496, 859, 860, 872, 842, 847, 848

[56] References Cited

U.S. PATENT DOCUMENTS

| | | | |
|---|---|---|---|
| 4,594,682 | 6/1986 | Drimak | 395/800 |
| 4,665,483 | 5/1987 | Ciacci et al. | 395/294 |
| 4,888,679 | 12/1989 | Fossum et al. | 395/800 |
| 5,056,011 | 10/1991 | Yashitake et al. | 395/848 |
| 5,276,818 | 1/1994 | Okazawa et al. | 395/294 |

*Primary Examiner*—Glenn Gossage
*Attorney, Agent, or Firm*—Staas & Halsey

[57] ABSTRACT

A memory accessing device is coupled to a first bus which connects a first buffer storage unit in a central processing unit to a second buffer storage unit. The memory accessing device can access, through the first bus, at least one of the first buffer storage unit and the second buffer storage unit independently of the central processing unit. The memory accessing device includes an address generating circuit for generating an address to access either or both of the first buffer storage unit and the second buffer storage unit. An output control unit in the memory accessing device outputs the address generated by the address generating circuit to the first bus. An output of the control unit enter an idle state if the second buffer storage unit issues a request for access to the first buffer storage unit when the memory accessing device obtains a right to use the first bus.

9 Claims, 21 Drawing Sheets

ARITHMETIC OPERATION UNIT AND MEMORY ACCESSING DEVICE FOR ACCESSING PRIMARY AND SECONDARY CACHE MEMORIES INDEPENDENTLY OF A CPU

BACKGROUND OF THE INVENTION

1. Field of the Invention

The present invention relates to a device for directly accessing a memory, forming a part of a computer system, independently of a central processing unit, and more specifically, to a memory accessing device which is connected to a bus for connecting a central processing unit, buffer storing units such as cache memories, etc. and which accesses a memory independently of the central processing unit, with a cache memory being kept consistent with the main memory storage.

2. Description of the Prior Art

The configuration of a central processing unit (hereinafter referred to as a CPU), having a built-in primary cache memory comprising a memory capable of being accessed rapidly by the CPU, and further having a secondary cache memory connected to the main storage unit, is very popular for improving the performance of a computer system. The primary cache memory is a high-speed, expensive, and relatively small capacity memory, while the secondary cache memory is a lower-speed and much cheaper memory, but is still faster and more expensive than the main memory storage.

FIG. 1 shows the configuration of a computer system which includes primary and secondary cache memories. The system shown in FIG. 1 comprises a CPU 2, which includes a primary cache memory 3, a secondary cache memory 4, a main storage unit 5, and an input/output unit 6 (hereinafter abbreviated to I/O unit). The CPU 2 and the secondary cache memory 4 are connected through a processor bus 8 (hereinafter abbreviated to a P bus). The secondary cache memory 4, the main storage unit 5, and the I/O unit 6 are connected through a memory bus 9 (hereinafter abbreviated to an M bus). The I/O unit 6 can perform a DMA (direct memory access) data transmission to and from the main storage unit 5 through the M bus 9.

The primary cache memory 3 and the secondary cache memory 4 in the above described system configuration must be kept logically consistent with the main storage unit 5 regardless of their write-through control method, that is, a write-through control method or a copy-back (write-back) control method. In the write-through control method, for example, data are written from the primary cache memory 3 to the secondary cache memory 4 and then from the secondary cache memory 4 to the main storage unit 5 if a block address in which data is to be written is in the primary cache memory 3. In the copy-back control method, block data are written in the primary cache memory 3 or the secondary cache memory 4, and then the contents of the main storage unit 5 is updated by transmitting the block data to the main storage unit 5 when the updated block data is to be replaced. Thus, the cache memory is kept consistent with the main storage memory when data are written to the cache memory regardless of whether the write-through control method or the copy-back control method is used.

If the main storage unit is rewritten, the data in it should be kept consistent with the data in a cache memory. Therefore, for example, if a part of the contents of the main storage unit 5 is rewritten by the I/O unit 6 connected through the M bus 9, the secondary cache memory 4 monitors the addresses on the M bus 9. If the data at the address where data have been rewritten in the main storage unit 5 are entered in the secondary cache memory 4, the entry in the cache memory is invalidated to maintain consistency between the secondary cache memory 4 and the main storage unit 5.

Then, the secondary cache memory 4 must inform the primary cache memory 3 of the fact that the contents of the main storage unit 5 has been rewritten. Therefore, the secondary cache 4 outputs a monitor request signal for invalidating a cache entry in the primary cache memory 3, and outputs the address of the main storage unit 5 according to which data have been rewritten. If the primary cache memory 3 receives the monitor request signal and the address information, and the primary cache memory 3 has an entry at the address according to which the main storage unit 5 has been rewritten, the primary cache memory 3 invalidates the entry in the cache memory to maintain consistency between the primary cache memory 3 and the main storage unit 5.

There is another system provided with a memory accessing device for accessing a secondary cache memory and a main storage memory independently of the CPU 2. FIG. 2 shows the configuration of the computer system comprising a memory accessing device 1. The memory accessing device 1 is, for example, a vector process unit (VPU), etc. in which the primary cache memory accesses the secondary cache memory instead of requiring the arithmetic operation of the CPU 2 to perform a vector operation at a high speed.

The memory accessing device 1 requests the right to use the P bus 8, indicated by a bus use right request signal 31, when an operation instruction is issued under control of the CPU 2.

In response to the request, a bus use right response signal 32 from the CPU 2 is asserted, and the memory accessing device 1 acquires the bus use right. Then, the device directly accesses a memory to perform a vector operation in a pipeline process.

Since the computer system has such a memory accessing device, a cache memory entry is invalidated to maintain consistency between the secondary cache memory 4 and the main storage unit 5. As in the case of FIG. 1, the cache memory entry is invalidated if the main storage unit 5 is rewritten by the I/O device 6, etc. on the M bus 9, when the memory accessing device 1 obtains the right to use the P bus 8 (obtains the bus use right of the P bus 8) and accesses the primary cache memory or the secondary cache memory. However, when the memory accessing device 1 obtains the bus use right of the P bus 8 for connecting the secondary cache memory 4 and the primary cache memory 3 in the CPU 2, the secondary cache memory 4 outputs an address on the P bus 8 to the primary cache memory 3. Accordingly, there arises a conflict between the secondary cache memory 4 and the memory accessing device 1 to output an address on the P bus 8, since usage of the P bus 8 is not managed. Therefore, it becomes impossible to inform the primary cache memory 3 of the fact that the contents of the main storage unit 5 have been rewritten. Thus, there has been a problem in that consistency cannot be successfully maintained.

To prevent such a bus use right conflict on the P bus 8, there is a method in which the secondary cache memory 4 controls the bus use right of the memory accessing device 1 described above. This method certainly prevents a conflict for use of the P bus, but anther problem, it takes much time to appropriately execute the bus arbitration (adjustment of bus use right, arises. For example, if the memory accessing device 1 is a vector processor for performing a pipeline process, a complicated sequence is required to interrupt the pipeline process.

Since the CPU 2 will be accessing the primary cache 3 if the system has to wait for the memory access unit 1 to complete its accessing operation, a problem has arisen in that an insignificant process is performed using the contents of the primary cache memory 3 without maintaining consistency between the main storage unit 5 and the cache memories.

SUMMARY OF THE INVENTION

An object of the present invention with this configuration is to maintain consistency between cache memories and a main storage unit.

Another object of the present invention is to realize a memory accessing device for forming part of a high performance system having no need of bus arbitration.

The present invention provides a memory accessing device coupled to a bus for connecting buffer storage units such as cache memories, etc., a central processing unit, and a main storage unit, so as to maintain consistency between the cache memories and the main storage unit and to access the memories independently of the central processing unit. The consistency between the primary cache memory and the main storage unit can be maintained without a bus conflict when the secondary cache memory issues, to the primary cache memory, a request for the invalidation of a cache memory entry.

The memory accessing device is connected to a first bus which is coupled to a first buffer storage unit in the central processing unit and to a second buffer storage unit. The memory accessing device accesses at least one of the first buffer storage unit and the second buffer storage unit independently of the central processing unit, and comprises an address generating circuit for generating an address according to which at least one of the first buffer storage unit and the second buffer storage unit is accessed; and an output control unit having an output for outputting the address to the first bus, and for controlling the out putting of the address to the first bus such that the output from the output control unit enters an idle state if the second buffer storage unit issues a request for access to the first buffer storage unit when the memory accessing device obtains the right of use of the first bus.

DESCRIPTION OF THE PREFERRED EMBODIMENTS

The present invention is explained below in detail by referring to the attached drawings.

Figure 1:
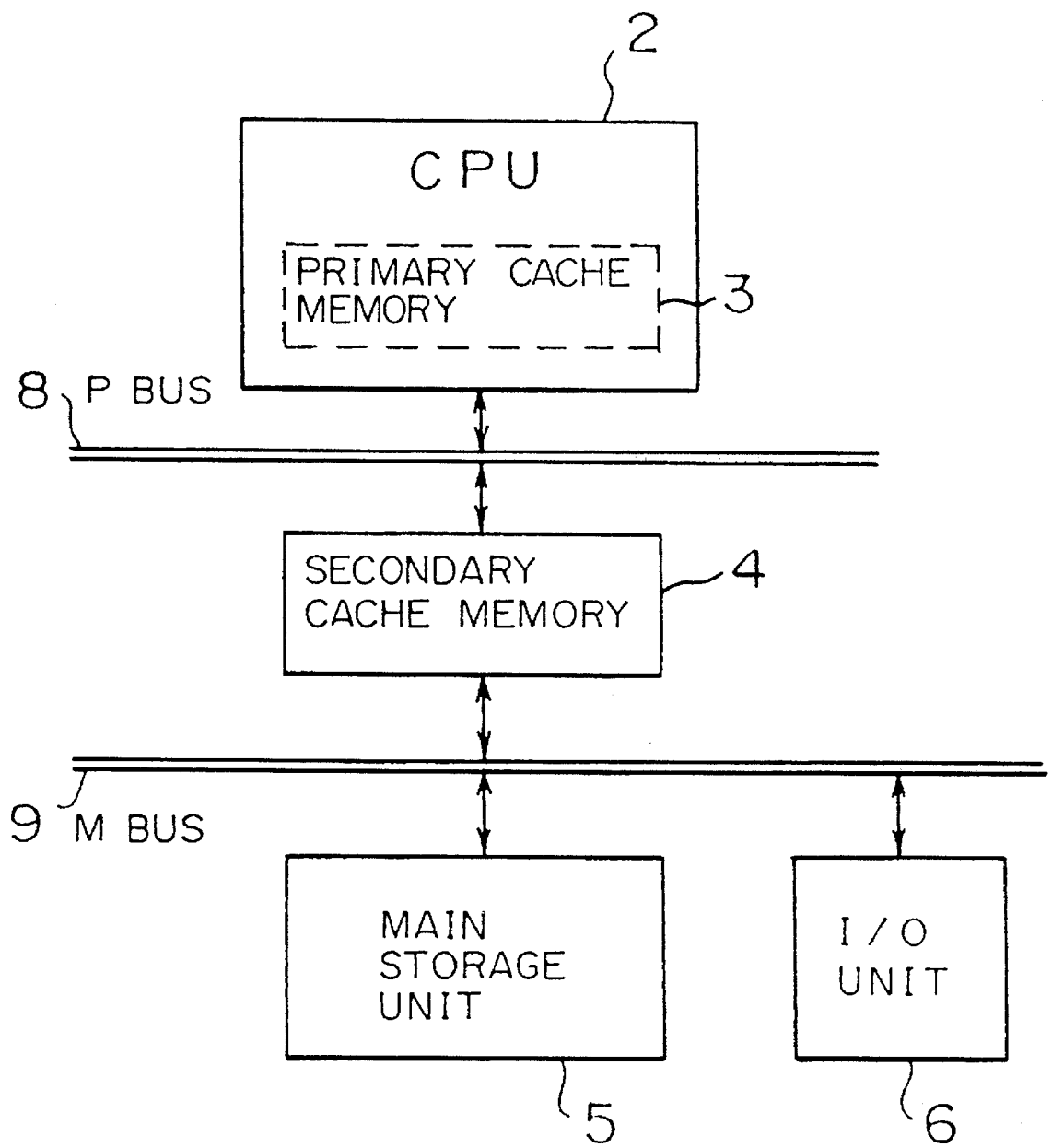
FIG. 1 shows the configuration of the computer system comprising the primary and secondary cache memories of the prior art.
Figure 2:
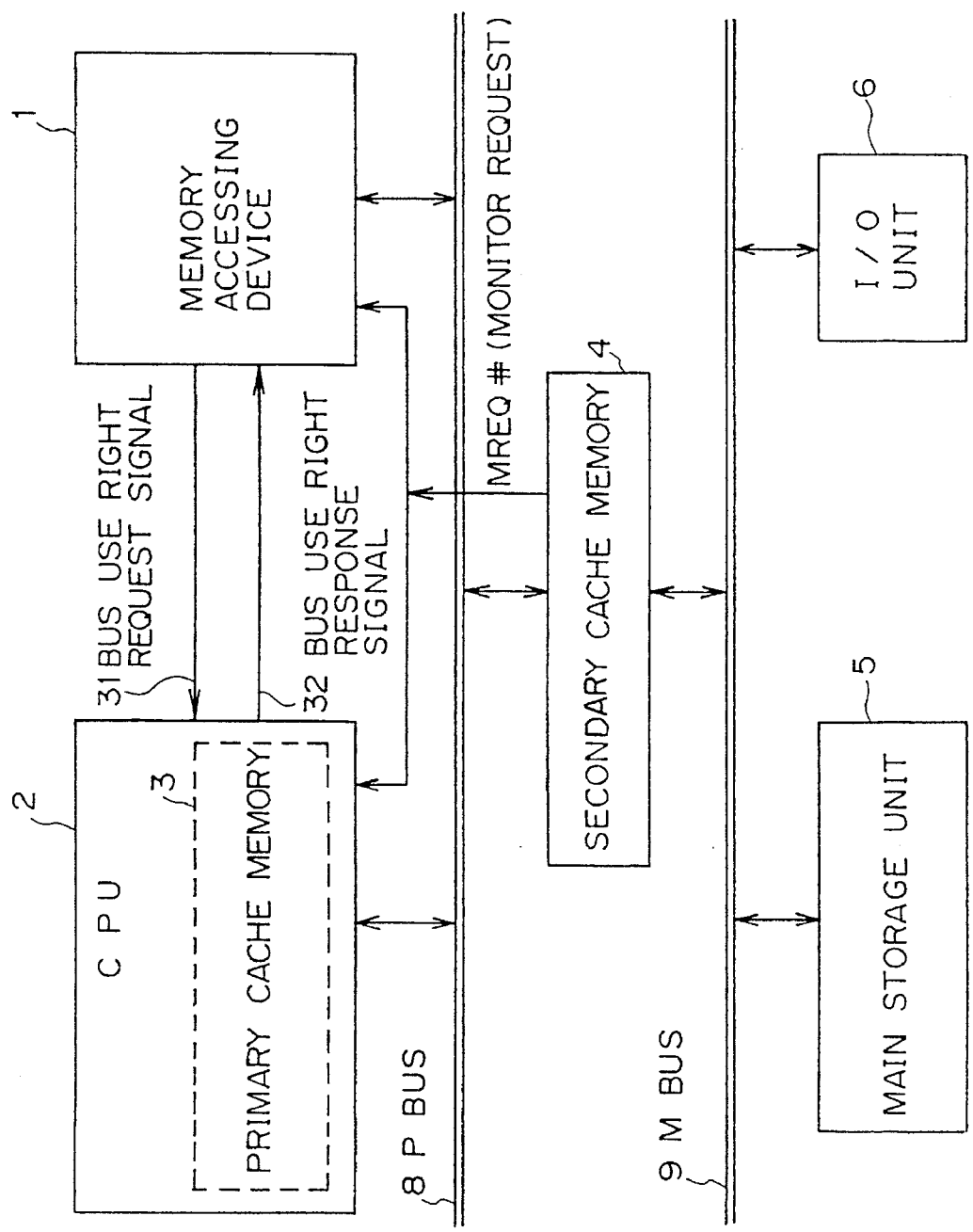
FIG. 2 shows the configuration of the computer system comprising the primary and secondary cache memories of the prior art.
Figure 3:
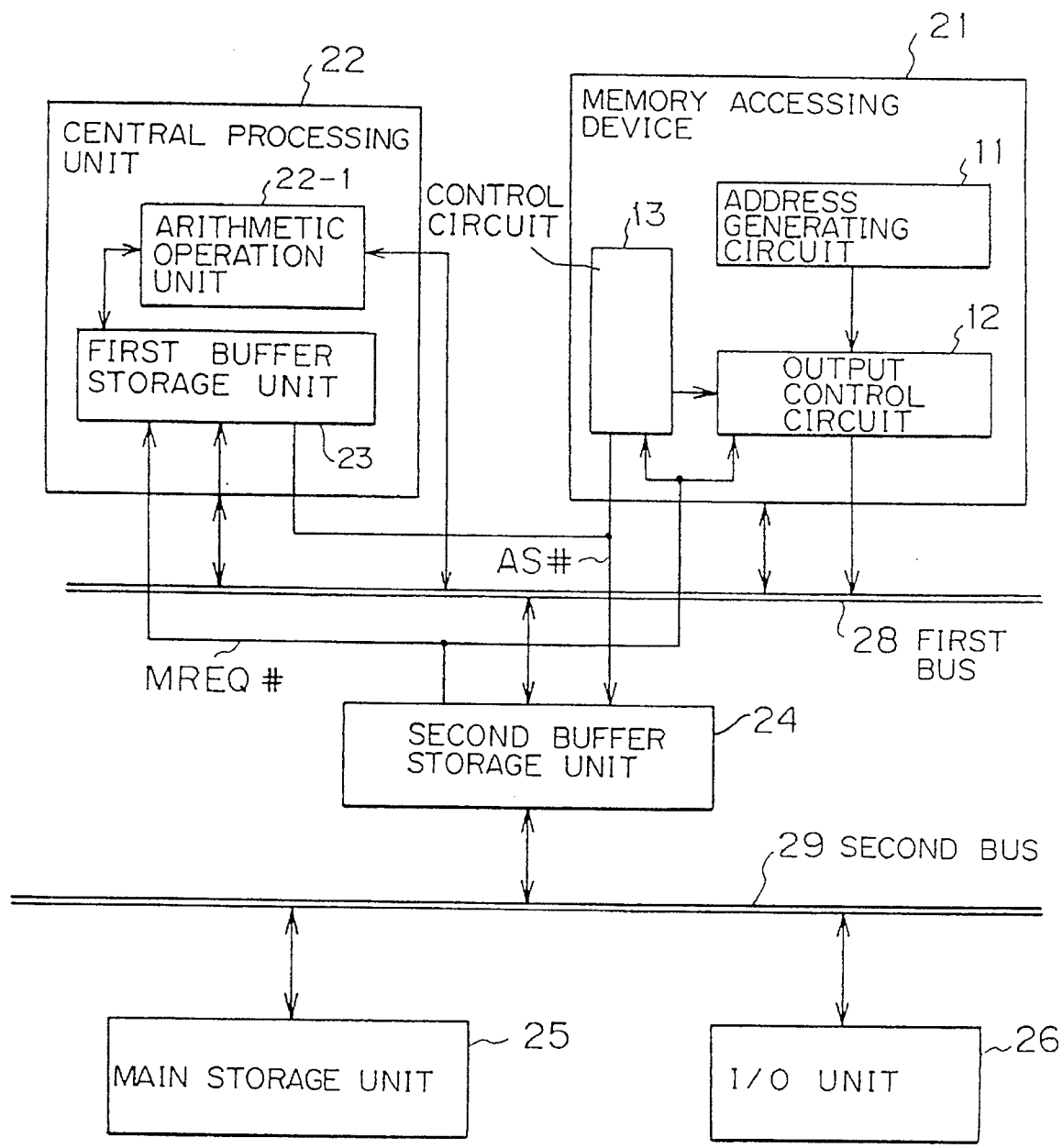
FIG. 3 shows a computer system comprising primary and secondary cache memories helpful in understanding the principle of in understanding the principle of the present invention.

FIG. 3 illustrates a computer system helpful in understanding the principle of the present invention.

The memory accessing device 21 of the present invention is coupled to a first bus 28 which couples a first buffer storage unit 23 to a second buffer storage unit 24. The first buffer storage unit 23 is provided in a central processing unit 22 and accessed at least from the first bus 28. Further, the memory accessing device 21 accesses the first buffer storage unit 23 or the second buffer storage unit 24 independently of the central processing unit 22.

The central processing unit 22 is provided with arithmetic operation unit 22-1 for decoding an instruction to perform a specified or target arithmetic operation. Arithmetic operation unit 22-1 executes an instruction in the first buffer storage unit 23, and performs a specified operation. The first buffer storage unit 23 monitoring whether the memory access apparatus 21 accesses the second buffer storage unit 24 to perform an address monitor and invalidates the data if the data is stored in the first buffer storage unit 23.

An address generating circuit 11 generates an address to access the second buffer storage unit 24, and outputs it to the first bus 28. The generated address is used to indicate where data used by the memory accessing device 21 to perform an arithmetic operation and the result of the arithmetic operation are stored. For example, the memory accessing device 21 can be a vector processor unit (VPU).

If the second buffer storage unit 24 issues a request for access to the first buffer storage unit 23 when the memory accessing device 21 has the bus use right of the first bus 28, an output control circuit 12 holds its outputs to the first bus in the high impedance state.

The control circuit 13 controls the changing of the state of the memory accessing device 21, and generates a store signal AS# indicating whether the output from the address generating circuit 11 is valid. (The symbol "#" following a signal name indicates a negative logic signal, similar to a "bar" over a name as shown in the drawings).

If the second buffer storage unit 24 issues a request for access to the first buffer storage unit 23 when the memory accessing device 21 has the bus use right of the first bus 28, the control circuit 13 holds the output of the output control circuit 12 in an idle state, for example in the high impedance state.

The first buffer storage unit 23 and the second buffer storage unit 24 function as cache memories for the central processing unit 22, and a request signal from the second buffer storage unit 24 for access to the first buffer storage unit 23 is a signal MREQ# for invalidating a cache memory entry to maintain the consistency between the main storage unit 25 and the corresponding cache memory.

In the memory accessing device 21 of the present invention, the output from the output control circuit 12 to the first bus 28 enters the idle state, such as the high impedance state, if the second buffer storage unit 24 issues a request for access to the first buffer storage unit 23 when the memory accessing device 21 has the bus use right of the first bus 28.

For example, if the first buffer storage unit 23 is a primary cache memory, the second buffer storage unit 24 is a secondary cache memory, and the contents of a main storage unit 25 is rewritten using DMA, by an I/O unit 26, the second buffer storage unit 24 detects this rewrite and issues a request to the first buffer storage unit 23 for the invalidation of a cache memory entry to maintain consistency between the main storage unit 25 and the first and second buffer storage units 23 and 24. In this case, since the address output from the output control circuit 12 in the memory accessing device 21 is held in the high impedance state, although the bus use right is held by the memory accessing device 21, consistency between the main storage unit 25 and the first and second buffer storage units 23 and 24 can be maintained within a short time without a bus conflict caused by an address outputted from the second buffer storage unit 24 to the first buffer storage unit 23 through the first bus 28 so as to invalidate a cache memory entry.

Furthermore, since the second buffer storage unit 24 invalidates a cache memory entry for the first buffer storage unit 23, bus arbitration, executed when the central processing unit 22 acquires the right to use the bus which releases the bus use right held by the memory accessing device 21, etc., is not required thus, a high performance system is realized.

Figure 4:
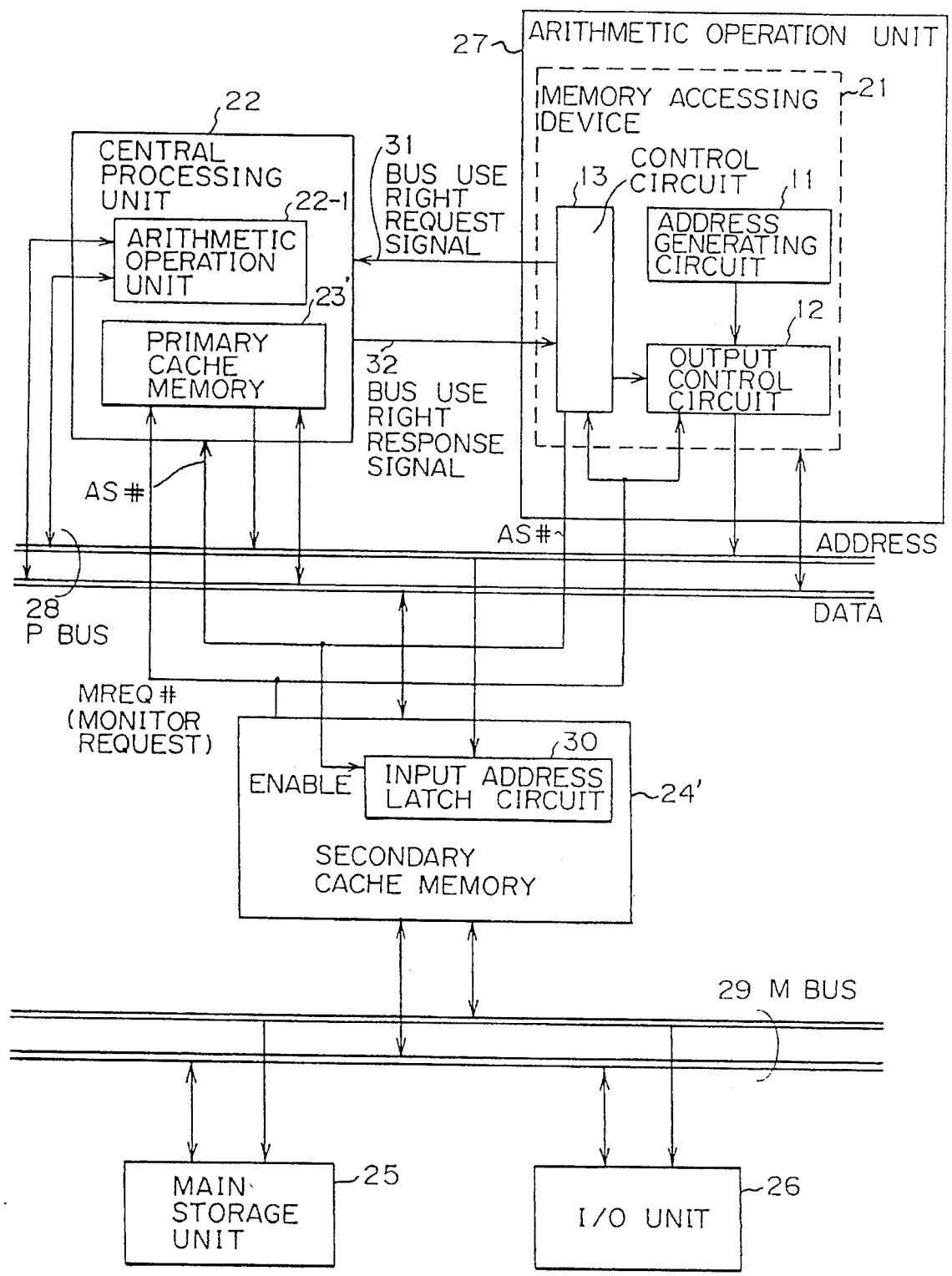
FIG. 4 shows the configuration of a computer system of the present invention, comprising primary and secondary cache memories.

FIG. 4 shows the system configuration for explaining an embodiment of the present invention. The central processing unit 22 comprises the primary cache memory 23' for storing instructions, and performing various operations. These operations are performed by the arithmetic operation unit 22-1 in the central processing unit 22.

As shown in FIG. 4, arithmetic operation unit 22-1 is connected to the processor or P bus 28 and the primary cache memory 23', and executes a program stored in the primary cache memory 23' to perform various arithmetic operations. Additionally, the arithmetic operation unit 22-1 stores control information in the control registers of the arithmetic operation unit 27 described later, and further, reads status information.

In the system shown in FIG. 4, the primary cache memory 23' and the central processing unit 22 are connected to the secondary cache memory 24' and an arithmetic operation unit 27 through the P bus 28.

The primary cache memory 23' stores, at a high speed, an instruction to be executed by the central processing unit 2. The central processing unit 22 may therefore retrieve and execute the instruction at a high speed. By contrast, as compared with the primary cache memory 23', the secondary cache memory 24' has a larger memory capacity, but operates at a lower speed. If the contents at a target address are not stored in the primary cache memory 23', the contents are read from the secondary cache memory 24', stored in the primary cache memory 23', and then retrieved and executed. Data, as well as instructions are stored in the primary and the secondary cache memories 23' and 24'. Furthermore, the secondary cache memory 24' is connected to the main storage unit 25 through an M bus 29. The I/O unit 26 is also connected to the M bus 29.

Each of the above described P bus 28 and M bus 29 comprises an address bus, a data bus, as well as a control bus which is not shown in FIG. 4. The main storage unit 25 can be accessed, and data and commands can be transmitted through these buses.

Programs and commands indispensable for the execution performed by the central processing unit 22 are stored in the main storage unit 25. If an address of data or a command not stored in the primary or the secondary cache memory 23' and 24' is detected, the corresponding data stored in the main storage unit 25 are stored in the secondary cache memory 24', and then stored in the primary cache memory 23'. If data and a command at a target address are stored in the secondary cache memory 24', where the capacity of the primary cache memory 23' is larger than that of the secondary cache memory 24', the data and the command are read from the secondary cache memory 24' and stored in the primary cache memory 23'. These primary and secondary cache memories 23' and 24' may be controlled by either write-through control or copyback control.

The central processing unit 22 executes a target program by accessing the primary and secondary cache memories 23' and 24'. As a result, however, the program stored in the main storage unit 25 is executed to complete each process. At this time, programs are executed at a high speed and consistency of data between the main storage unit 25 and the primary and the secondary cache memories 23' and 24' is correctly maintained.

If an arithmetic operation to be processed is so complicated that it cannot be processed by the central processing unit 22, the arithmetic operation unit 27, as shown in FIG. 4, is provided and used for successfully performing the complicated operations. The arithmetic operation unit 27 can be a vector processor unit (VPU), for example. The VPU 27 may directly access a memory and perform a vector operation in a pipeline process. Therefore, the memory accessing device 21 for directly accessing a memory is provided in the arithmetic operation unit 27.

When the central processing unit 22 instructs the arithmetic operation unit 27 to execute an operation, it writes an instruction to a register (not shown in FIG. 4) in the arithmetic operation unit through the P bus 28, and the memory accessing device 21 is operated according to the result of the operation to read and write the data in the primary cache memory 23'. The arithmetic operation unit 27 directly accesses the primary cache memory 23' when it performs an operation according to the command received from the central processing unit 22. At this time, the central processing unit 22 is requested to release the bus so the bus use right may pass to the arithmetic operation unit 27. More specifically, the central processing unit 22 receives a bus use right request 31, and releases the P bus 28 at a timing which permits the release of the P bus 28, and outputs the bus use right response signal 32 to the control circuit 13 in the memory accessing device 21 of the arithmetic operation unit 27.

On receiving the bus use right response signal 32, the control circuit 13 recognizes the acquisition of the bus use right, and controls the output control circuit 12 which outputs, in response, an address signal, corresponding to the address generated by the address generating circuit 11, to the address bus of the P bus 28. The arithmetic operation unit 27 outputs to the P bus 28, data to be written to the primary cache memory 23'. The P bus 28 also transmits, to arithmetic operation unit 27, the data received from the primary cache memory 23'. The arithmetic operation unit 27 performs a vector operation using an address, data stored in the primary cache memory 23' and data obtained by accessing the data bus, of the P bus 28.

Assume that data must be rewritten from the I/O unit 26 to the main storage unit 25 during the operations as described above. The secondary cache memory 24' monitors what part of the area in the main storage unit 25 is accessed, to maintain consistency of data. If the data in the accessed area are stored in the secondary cache memory 24', the data invalidated. If the data associated with the address are stored in the primary cache memory 23', an input address latch circuit 30 stores the address to be invalidated to specify it as an input address.

Then, the monitor request signal MREQ# is outputted to the central processing unit 22, and to the control circuit 13 and the output control circuit 12 in the memory accessing unit 21 in the arithmetic operation unit 27.

For example, when the arithmetic operation unit 27 is operating as described above, the control circuit 13 in the memory accessing device 21 recognizes it, issues an instruction specifying that the output from the output control circuit 12 should indicate high impedance, and outputs an address strobe signal AS# to the secondary cache memory 24'. The address strobe signal AS# is applied to an output enable terminal of an input address latch circuit 30, and the input address latch circuit 30 outputs the address value to the address bus of the P bus 28 when the address strobe signal AS# indicates the L level. Then, the primary cache memory 23' invalidates the area associated with the address outputted by the input address latch circuit 30.

The address strobe signal AS# is outputted by a unit having the bus use right. In the case described above, the arithmetic operation unit 27 acquires the bus use right. In the case that the central processing unit 22 obtains the bus use right, for example, the address strobe signal AS# is outputted by the central processing unit.

To control the output timing of each signal, a state machine 13' (shown in FIG. 5) in the control circuit 13, manages each of states T1–T5 and T1W–T5W. Each state is described later (refer to FIGS. 13–17).

The memory accessing device 21 of the present invention receives from the secondary cache memory 24' a monitor request signal MREQ# for invalidating a cache memory entry in the primary cache memory 23'. If the monitor request signal MREQ# is asserted, the address output ADDRESS (O) of the memory accessing device 21 is held in the high impedance state. Hereinafter, (O) preceded by a symbol refers to an output, and (I) refers to an input. "Assert" means an active state and "negate" means an inactive state.

However, the following conditions exist so the address output ADDRESS (O) may be held in the high impedance state. All units that output an address and directly access a memory output a strobe signal AS# indicating whether its respective output address is valid. An outputted address is recognized as valid while the strobe signal is asserted, and the external circuits use the address outputted at that time.

When an address strobe signal AS# (O) is asserted, the address ADDRESS (O) is not held in the high impedance state. If the output address ADDRESS (O) is held in the high impedance state only because the monitor request signal MREQ# is asserted when the address strobe signal AS# is asserted, the external circuits recognize the address in the high impedance state as a valid address, thus possibly causing a malfunction of the system.

This problem holds true with the configuration of the computer system in which only the CPU 22 is connected to the P bus 8, and the secondary cache memory 24' does not output a monitor request signal MREQ# while the address strobe signal AS# (O) is asserted.

With the system configuration shown in FIG. 4, the memory accessing device 21 is operating in synchronization with the CPU 22 according to the same clock, and is often required to operate at a very high speed. Therefore, an address strobe signal AS# (O) is outputted immediately after the start of bus access.

However, the secondary cache memory 24' may not recognize that the address strobe signal AS# (O) is asserted. For example, if an address strobe signal AS# (O) must be asserted immediately after a monitor request signal MREQ# is asserted, when the memory accessing device 21 obtains the bus use right of the P bus 28 and is accessing a memory, the secondary cache memory may not recognize the assertion.

If an output address ADDRESS (O) is held in the high impedance state only because a monitor request signal MREQ# is asserted, the address ADDRESS (O) is held in the high impedance state while an address strobe signal AS# (O) is asserted, thus causing a malfunction of the system.

That is, if a monitor request signal MREQ# is detected in the cycle in which an address strobe signal AS# (O) is to be outputted, it means that the present state is being changed to the following state T1 described later. In this case, the state is changed to T1 upon receipt of an access completion signal DC# (I) or on obtaining a bus use right. More specifically, state T1 indicates the change of a bus. At this time, the memory accessing device 21 continues the state in which the current bus use right is held without proceeding with the next bus access when a monitor request signal MREQ# is detected, or more specifically, is in idle state Ti. In idle state Ti, the memory accessing device 21 is held in a state in which an address ADDRESS (O) is not outputted, that is, the high impedance state. Therefore, there is no problem of a bus conflict with an address outputted by the secondary cache memory 24'. Idle state Ti can be released by negating a monitor request signal MREQ#. If the monitor request signal MREQ# is negated, state Tl is entered. These states Ti and Tl are described later.

If a monitor request signal MREQ# is detected during the bus cycle in a memory accessing process, an address strobe signal AS# (O) is outputted to indicate that an access completion signal DC# (I), that is, a bus access response signal, has not been returned yet. In this case, the address strobe signal AS# (O) has been outputted, and the output address ADDRESS (O) can be held in the high impedance state. Therefore, on detecting a monitor request signal MREQ#, the memory accessing device 21 controls the outputs such that only an already outputted address is held in the high impedance state.

The operations of the output control circuit 12 and the control circuit 13 in the memory accessing device 21, and more specifically a buffer control unit 12' and a state machine 13', are further described below in detail.

Figure 5:
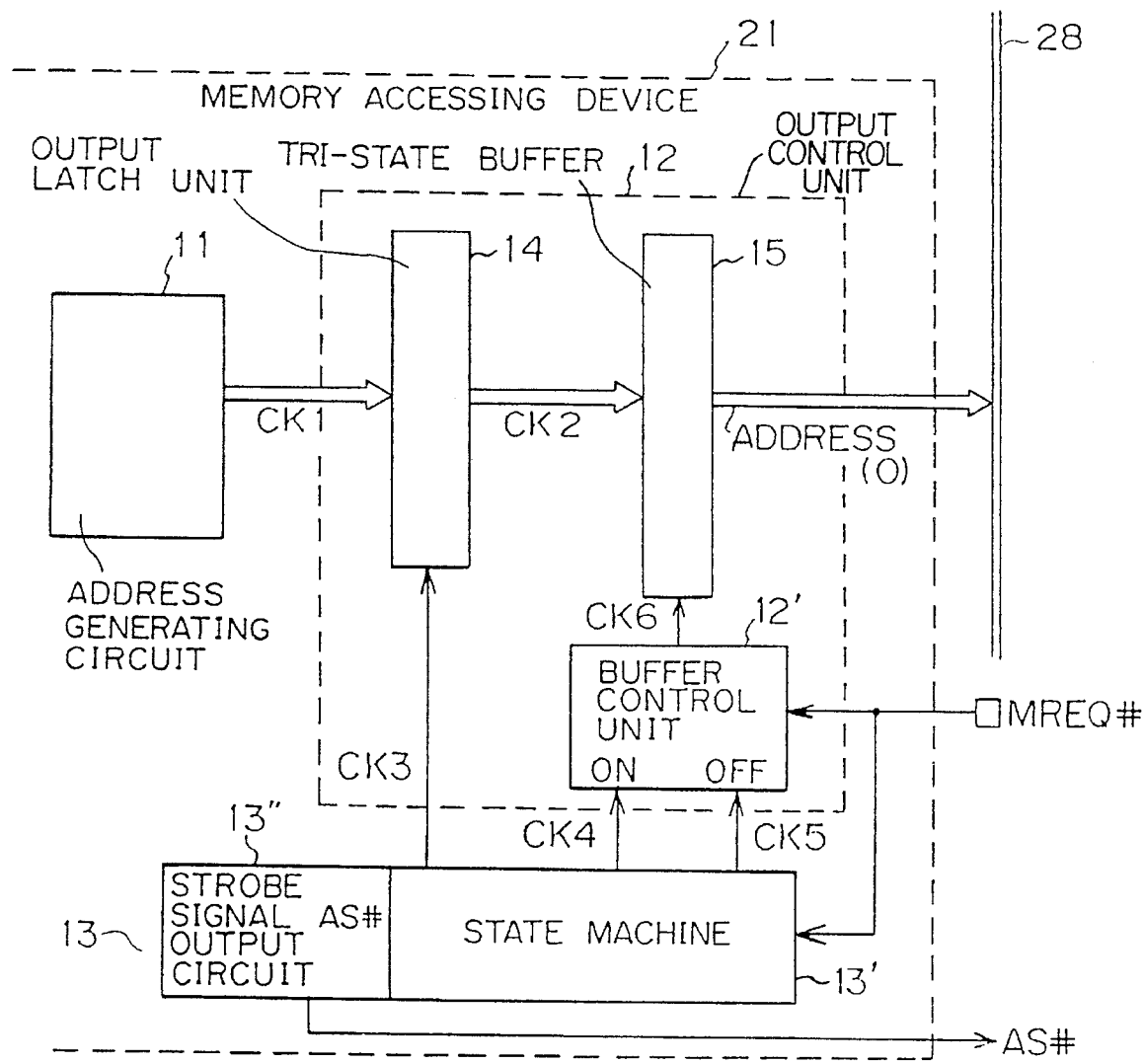
FIG. 5 shows the configuration of the memory accessing device of an embodiment of the present invention.
Figure 6:
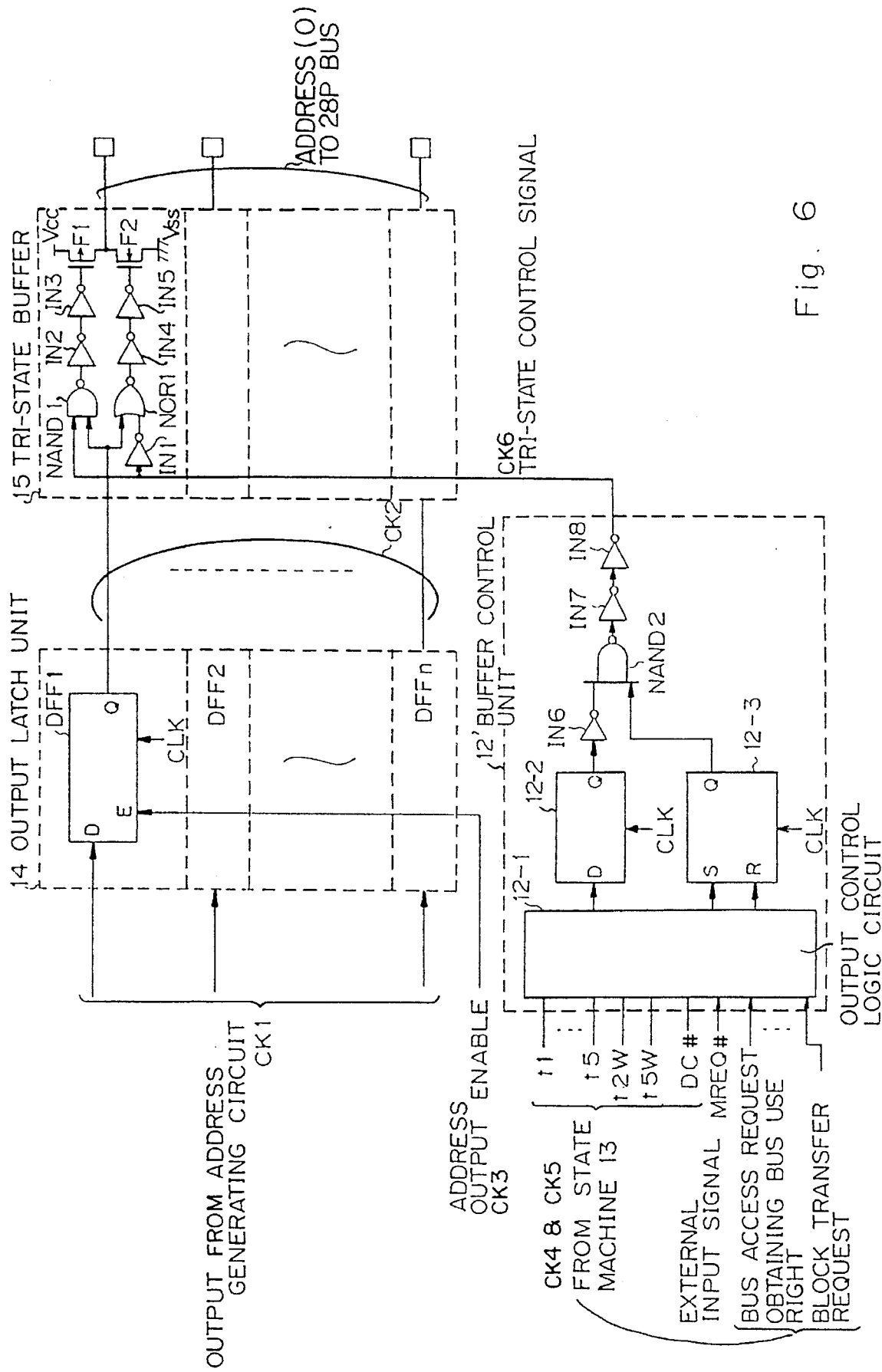
FIG. 6 shows the detailed configuration of the memory accessing device comprising an output latch unit, a tri-state buffer, and a buffer control unit.

FIG. 5 shows the configuration of the memory accessing device of an embodiment of the present invention. FIG. 6 shows the detailed configuration of the memory accessing device 21 of FIG. 5. It is noted here that with respect to the signals CK4 and CK5 illustrated in FIG. 5 and the inputs to the buffer control unit 12' in FIG. 6, there is no one-to-one correspondence between the signals. As illustrated in FIG. 5 signal CK4 causes the buffer control unit 12' to turn ON, while signal CK5 causes the buffer control unit 12' to turn OFF. This is a simplification of the multiple signals illustrated in FIG. 6 as being received by the buffer control unit 12' and operated on by the output control logic circuit 12-1. The output control logic circuit 12-1 turns the buffer control unit 12' ON or OFF, based upon the input signals received from state machine 13. In FIG. 5, output control circuit 12 comprises an output latch unit 14, a tri-state buffer 15, and a buffer control unit 12'. The control circuit 13 comprises a state machine 13' and a strobe signal output circuit 13". Address CK1, outputted by the address generating circuit 11, is applied bit by bit to D-type flip-flops DFF1–DFFn in the output latch unit 14. For example, address CK1 is stored in the 64-bit output latch unit 14 when a vector processor unit is used.

A clock CLK is applied to the output latch unit 14, and D-type flip-flops DFF1–DFFn received data in synchronization with the clock CLK. An address output enable signal is applied to the output latch unit 14. The output latch unit 14 receives address signal CK1, outputted by the address generating circuit 11 according to the clock, when the address output enable signal indicates the H level. When the output address enable signal indicates the L level, the state is held as is.

The output from the output latch unit 14 is applied to the tri-state buffer 15. The tri-state buffer 15 has three output states, more specifically, a high impedance state, a L level, and a H level, and is held in the high impedance state (HIGH Z) when a tri-state control signal indicates the L level. When the tri-state control signal indicates the H level, a signal is outputted by D-type flip-flops DFF1–DFFn in the output latch unit 14. The operation of the tri-state buffer 15 is explained below.

The output from the output latch unit 14 is applied to NAND gate NAND1 and NOR gate NOR1. When a tri-state control signal indicates the H level, NAND gate NAND1 is turned on, and NOR gate NOR1 is also turned on because the L level is applied to the NOR gate NOR1 gate through inverter IN1. The output from NAND gate NAND1 is applied to output FET F1 through inverters IN2 and IN3, and the output from NOR gate NOR1 is outputted to output FET F2 through inverters IN4 and IN5. Thus, transistors F1 and F2 are turned on and off according to the H and the L levels outputted by the output latch unit 14. More specifically, transistor F1 is turned on and transistor F2 is turned off when the H level is applied. By contrast, with a the L level, transistor F1 is turned off, while transistor F2 is turned on. Thus, address CK1 is outputted by the address generating circuit 11 from the tri-state buffer 15 to the P bus through the latch circuit.

When the buffer control unit 12' outputs a tri-state control signal at the L level, the L level is applied to NAND gate NAND1. Therefore, NAND1 is turned off and outputs the H level, and the H level is applied to NOR gate NOR1 through inverter IN1. Then, NOR1 is turned off and outputs the L level. Since all the output is applied to FETs F1 and F2 through two-step inverters IN2 and IN3, and IN4 and IN5, both FETs F1 and F2 are turned off. As a result, the output is held in the high impedance state.

State signals t1–t5, t2W, and t5W from the state machine 13' described later, external input signals DC# and MREQ#, a bus access request signal, an obtaining bus use right signal (see, e.g., FIG. 6), and a bus acquisition block transfer request signal, are applied to output control logic circuit 12-1 in the buffer control unit 12'. The output control logic circuit 12-1 detects the state in which a bus is to be accessed according to state signals t1–t5, t2W, and t5W from the state machine 13', external input signals DC# and MREQ#, and the bus access request signal, the obtaining bus use right signal, and then generates a signal for controlling the tri-state buffer 15. The buffer control unit 12' comprises output control logic circuit 12-1, D-type flip-flop 12-2, set/reset flip-flop 12-3, inverter IN6, NAND gate NAND2, and inverts IN7 and IN8.

Figure 7:
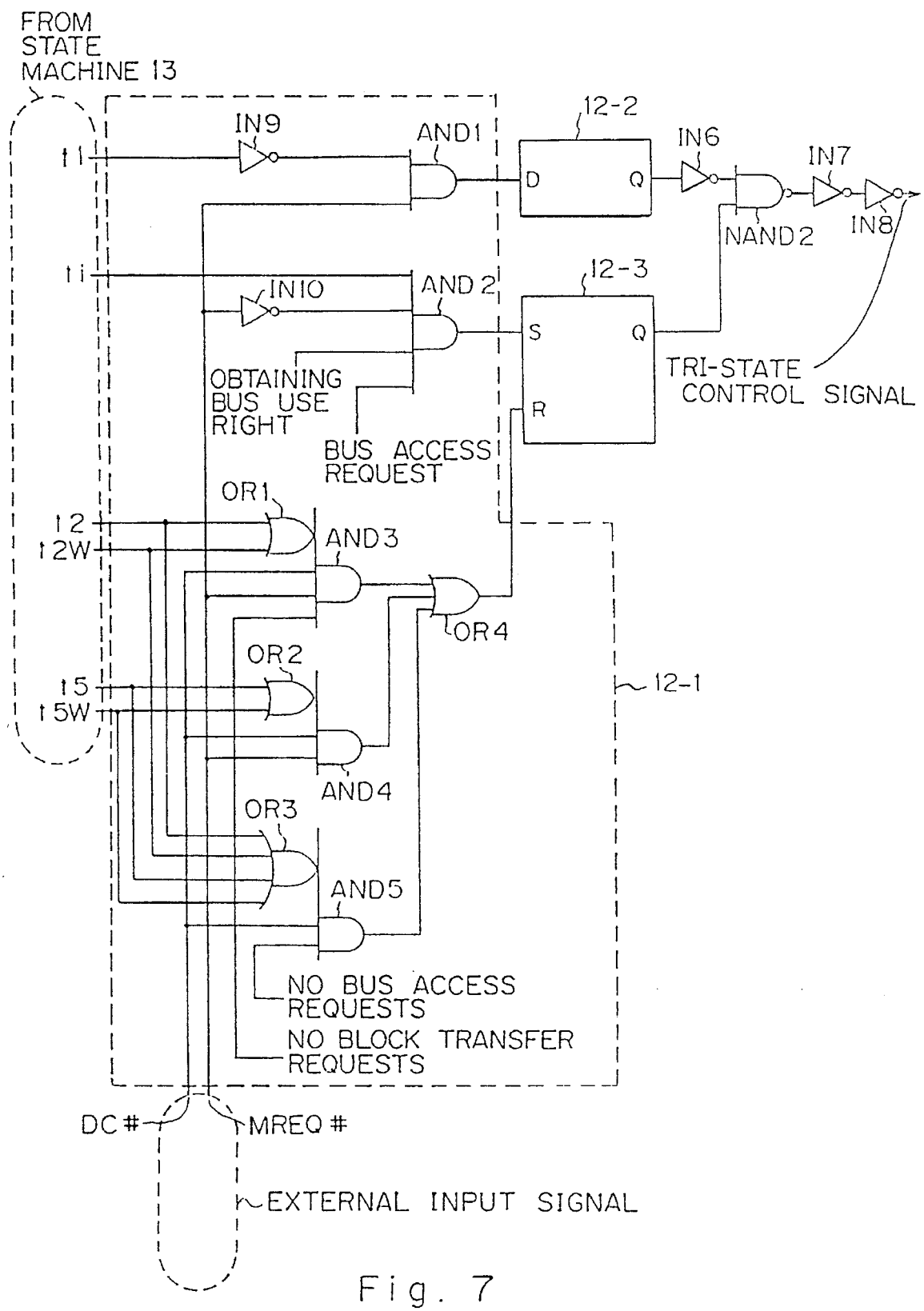
FIG. 7 shows the detailed configuration of the output control logic circuit.

FIG. 7 shows the detailed configuration of the output control logic circuit 12-1. An external input signal MREQ# is applied to AND gate AND2 through inverter IN10 and to AND gates AND1, AND3, and AND4. Another external input signal, an access completion signal (DC#), is inputted to AND gates AND3–AND5. Signal t1 from the state machine 13' is applied to AND gate AND1 through inverter IN9, and is applied to AND gate AND2. The obtaining bus use right signal and the bus access request signal are also applied to AND gate AND2. Signals t2 and t2W are applied to AND gate AND3 through OR gate OR1. A no block transfer requests signal is also applied to AND gate AND3. Signals t5 and tSW are applied to AND gate AND3 through OR gate OR2. Signals t2, t5, t2W, and t5W are also applied to AND gate AND5 through OR gate OR3. (Signals from the state machine described in detail in conjunction with FIG. 8).

According to a signal received from the above described state machine 13', the H level is applied to D-type flip-flop 12-2 by output control logic circuit 12-1 when MREQ# is asserted and the state is not in state T1 (tl=H). At this time, the H level is inverted through inverter IN6 and applied to NAND gate NAND2, and the output from hAND2 is forcibly converted to the H level, and outputted as a tri-state control signal through inverters IN7 and IN8. Thus, the tri-state control signal turns to the H level.

Since the output from AND gates AND3–AND5 is ORed by OR gate OR4, and the result is applied to the reset terminal of RS flip-flop 12-3, then RS flip-flop 12-3 is reset when one of AND gates AND3, AND4, and AND5 indicates the H level and the output turns to the L level. The reset condition exists if the H level is outputted from AND gates AND3–AND5 when DC# and MREQ# are asserted in state T2 or T2W and there are no block transfer requests, when DC# and MREQ# are asserted in state T5 or T5W, or when DC# is asserted and no bus access requests are issued in state T2, T2W, T5W, or T5. Thus, it is reset and outputted at the L level. Therefore, as described above, the tri-state control signal turns to the H level.

RS flip-flop 12-3 is set and the output turns Q to the H level when an access completion signal DC# is not asserted in state Ti (the idle state) and when a bus right is acquired and a bus access request is issued. The output of D-type flip-flop 12-2 is set to the L level in state t1 when MREQ# is not asserted. Thus, the L level is turned to the H level through inverter IN6, and the H level of RS flip-flop 12-3 as well as the H level from inverter IN6 is applied to NAND gate NAND2, and the L level is outputted as a tri-state control signal through inverters IN7 and IN8.

In FIG. 5, the output control circuit 12 of the memory accessing device 21 comprises, as described above, the output latch unit 14, the tri-state buffer 15, and the buffer control unit 12', and further comprises an input terminal for a monitor request signal MREQ# which is provided to the state machine 13' and buffer control unit 12'.

Figure 8:
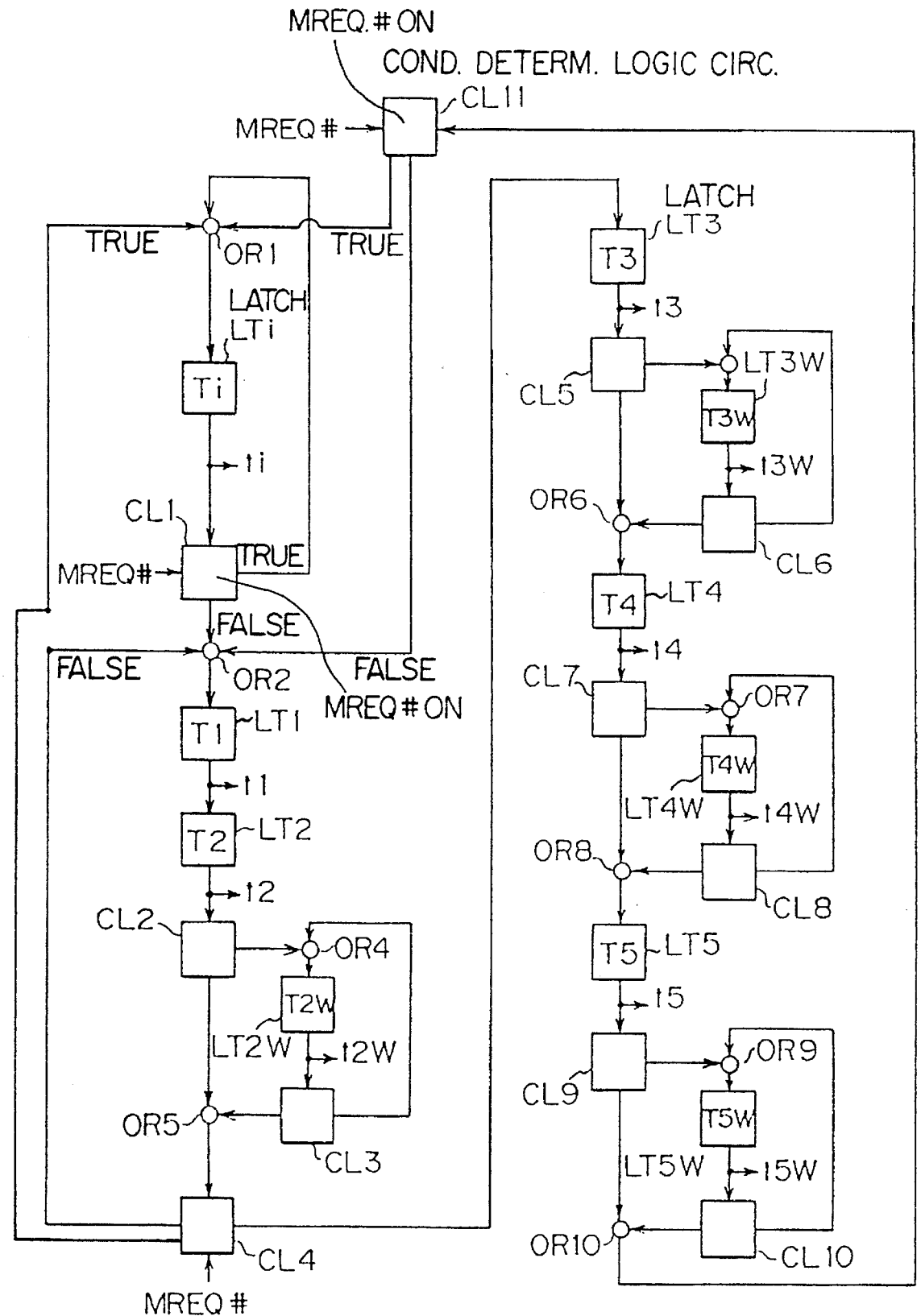
FIG. 8 shows a configuration of the state machine the memory accessing device of an embodiment of the present invention.

The bus timing of the memory accessing device 21 is managed by the state machine 13'. FIG. 8 shows the configuration of the circuit in the state machine 13'.

In FIG. 8, LTi, LT1–LT5, and LT2W–LT5W are latches for storing states Ti, T1–T5, and T2W–T5W respectively; ti, t1–t5, and t2W–t5W are output signals from latches LTi, LT1–LT5, LT2W–LT5W respectively; CL1, CL2, CL3, CL4, CL5, . . . , CL10, and CL11 are condition determining logical circuits; and OR1–OR10 are logical sum (OR) circuits.

Thus, the state machine comprises latches LTi, LT1–LT5, LT2W–LT5W, each latch corresponding to a state of a bus timing, and their transition conditions are determined by condition determining logical circuit CL1, CL2, CL3, CL4, CL5, . . . , CL10, or CL11. Determination is made as to what state is to be reached depending on the condition. Therefore, a control signal such as an access completion signal DC# (I), etc. is applied to one of the condition determining logical circuit CL1, CL2, CL3, CL4, CL5, . . . , CL10, or CL11. Thus, the next state is determined.

For example, state T2 can be changed to one of the following four states:

(1) State T3 if a block transfer condition exists when the access completion signal DC# (I) is asserted.

(2) State T1 if a block transfer condition does not exist and a bus access request is issued when the access completion signal DC# (I) is asserted.

(3) State Ti if a block transfer condition does not exist and a bus access request is not issued when the access completion signal DC# (I) is asserted.

(4) State T2W when the access completion signal DC# (I) is negated.

"#" as in access completion signal DC# (I) indicates negative logic, while "(I) indicates input.

That is, condition determining logical circuit CL2 is configured such that the output going to logical sum circuit OR5 is asserted if the access completion signal DC# "(I)" is asserted when signal t2 is asserted, and the output going to logical sum circuit OR4 is asserted if the access completion signal DC# (I) is negated. Condition determining logical circuit CL4 is configured such that the output going to latch LT3 is asserted if a block transfer condition exists when the output signal of logical sum circuit OR5 is asserted. The output to logical sum circuit OR2 is asserted if a block transfer condition does not exist and a bus access request is issued. Lastly, the output to logical sum circuit OR1 is asserted if a block transfer condition does not exist and a bus access request is not issued.

Other condition determining logical circuits are configured similarly. Accordingly, a latch for each state in the state machine is always operated according to clock signal CLK only. If the output from latch Tj (j=1, . . . , 5, 2W, . . . , 5W) is asserted, it indicates that the bus is in state Tj.

In condition determining logical circuits CL1 and CL11, the state is changed, or, more specifically, the H level output direction is changed, according to the condition that the OFF output is asserted when the monitor request signal MREQ# is negated. Likewise, in condition determining logical circuit CL4, the state is changed according to the condition that the ON output going to logical sum circuit OR1 is asserted when a monitor request signal MREQ# is asserted.

FIG. 5 is further explained below. The timing for latching an address generated by the output latch unit 14 is controlled according to control signal CK3 from the state machine 13'. Control signal CK3 is asserted according to the timing of a change from state Ti to state T1, from T2 to state T1, or from state T5 to state T1, that is, according to output signal t1 from latch LT1 in the state machine 13'.

The buffer control unit 12' controls the output of addresses from the tri-state buffer 15 such that output CK2 from the output latch unit 14 is passed through, as is, at the tri-state buffer 15, as address output ADDRESS (O) when control signal CK4 is asserted and the monitor request signal MREQ# is negated, and the output from the tri-state buffer 15 is held in the high impedance state when control signal CK5 is asserted or the monitor request signal MREQ# is asserted.

Figure 9:
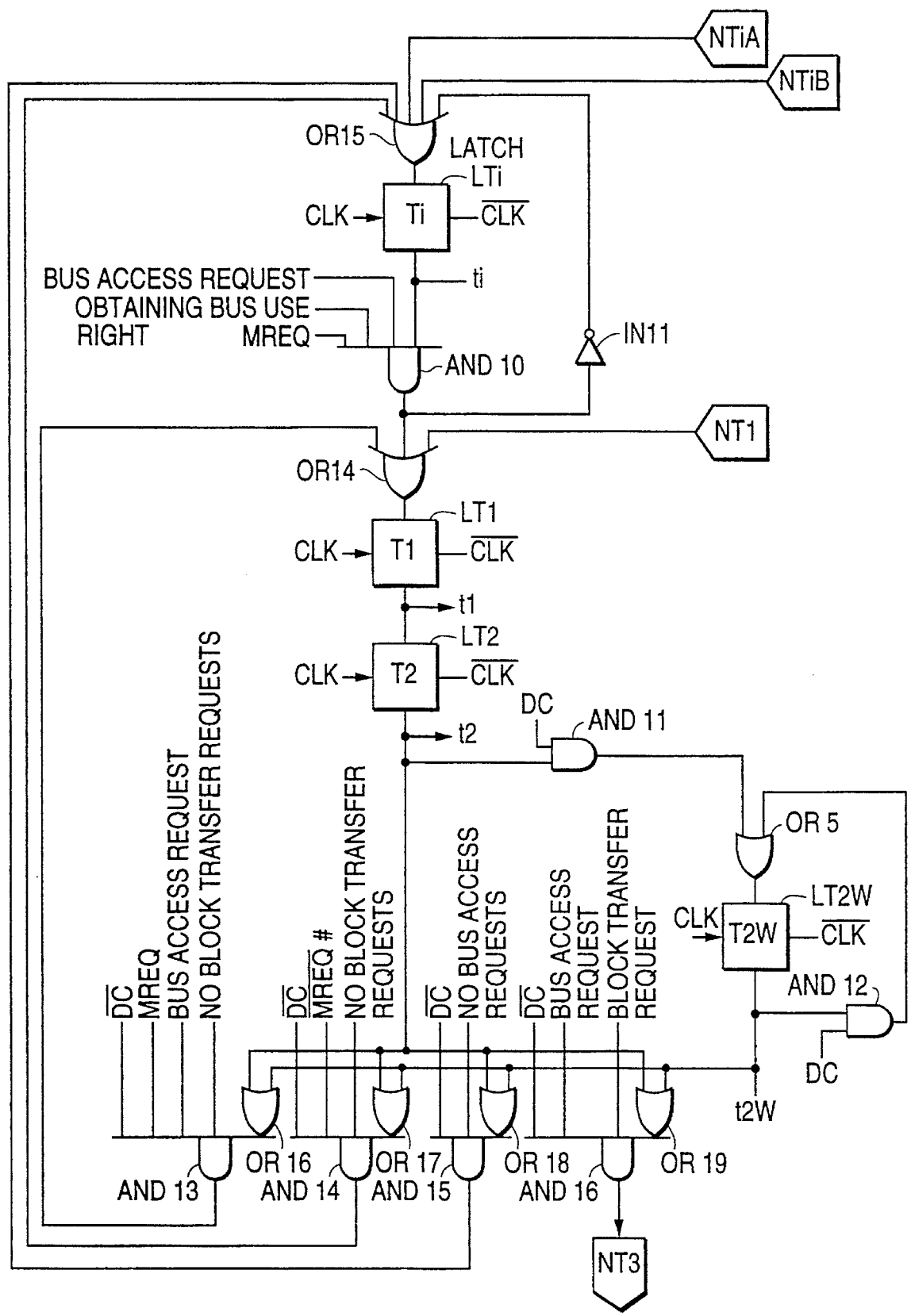
FIG. 9 shows in detail a first part of the configuration of the state machine in the memory accessing device of an embodiment of the present invention.
Figure 10:
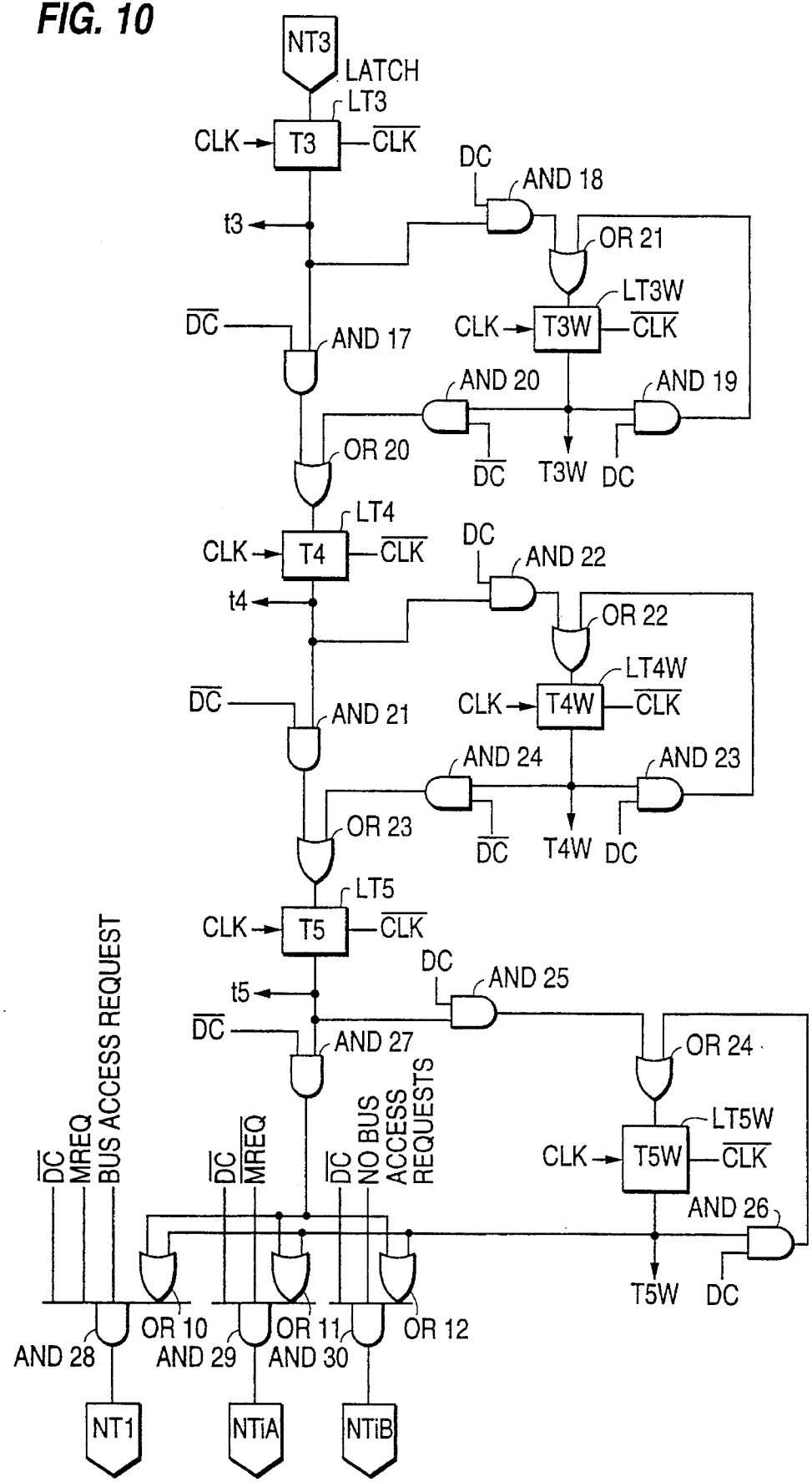
FIG. 10 shows in detail a second part of the configuration of the state machine in the memory accessing device of an embodiment of the present invention.

The state machine is now further explained in detail. FIGS. 9 and 10 show in detail the configuration of the state machine. Latches, Ti, T1–T5, and TW2–TW5 are set by input data received according to the clock CLK.

Latch LTi is set to the H level during the idle state, and the output is provided as signal ti to the above described output control logic circuit 12. When the H level output from latch LTi is applied to AND gate AND10 (signal ti indicates the H level), a bus access request is issued, the bus use right is and MREQ⌒ is negated, the output from AND gate AND10 turns to the H level, and latch LT1 is set to the H level through OR gate OR14. If any of the above described conditions does not exist, i.e., if a bus access request is not issued, a bus use right is not obtained, or MREQ# is not negated, the output from AND gate AND10 turns to L level, and the H level is applied to latch LTi through inverters IN11 and OR gate OR15. More specifically, latch LTi is always held in the H level unless a given condition exists.

If the above described conditions exist, the H level is applied to latch LTi through OR gate OR14, and the H level is accepted at the next timing according to the clock CLK. Then, at the next timing according to the clock CLK, latch LT2 turns to the H level. At this time, following the first idle state, the state is unconditionally changed from state T1 to state T2. The outputs t1 and t2 from latches LT1 and LT2 respectively, are outputted to the output control logic circuit as described above.

Then, the H level of the output from latch LT2 is applied to AND gate AND11. If, at this time, the access completion signal, DC#, is at a H level (DC# negated), the output changes or turns to the H level and the output of the latch LT2W turns to the H level through OR gate OR5. When DC# is negated (DC received), the H level is applied to the input terminal to latch LT2W through AND gate AND12 to hold the present state. Output t2W from latch LT2W is also inputted to the output control logic circuit as a state signal.

State signals t2W and t2 are applied to OR gates OR16–OR19, the outputs of which are used to enter state T2W or state T2. When at least the t2w signal or t2 signal indicates the H level, the H level is applied to AND gates AND13–AND16.

When DC# is asserted in state T2 or T2W, MREQ# is negated, a bus access request is issued, a no block transfer request signal is applied to AND gate AND13, and all these inputs indicate the H level, the output from AND gate AND13 turns to the H level and is applied to latch LT1 through OR gate OR14. More specifically, the state machine returns to state T1 at this time. When DC# is asserted, MREQ# is asserted, the block transfer request is not issued and the state machine is in state T2 or T2W the output from AND gate AND14, to which each of these signals is applied, sets latch LTi through OR gate OR15. At this time, when DC# is asserted, a bus access request is not issued and the state machine is in state T2 or T2W, the output from AND gate AND15 turns to the H level and state Ti, that is, the idle state, is set.

Furthermore, if DC# is asserted, a bus access request and a block transfer request are issued and state T2 or T2W is retained, the output from AND gate AND16 turns to the H level and the H level is applied to latch LT3. In FIGS. 9 and 10, NT1, NT3, NTiA and NTiB are connection terminals for connecting FIG. 9 to FIG. 10.

If latch LT3 is set (the output indicates the H level), it indicates state T3 is reached. If DC# is asserted in state T3, the output of AND gate AND17 turns to the H level, and the H level is applied to latch LT4 through OR gate OR20. If DC# is negated, then the output from AND gate AND18 turns to the H level, and the H level is applied to latch LT3W through OR gate OR21, and latch LT3W accepts the H level at the next receipt of a clock signal.

When the output from latch LT3W retains the H level, the output from AND gate AND19 is the H level if DC# is negated and the H level is applied to latch LT3W through OR gate OR21. This state is retained while DC# remains negated. If DC# is asserted, the output from AND gate AND20 turns to the H level, and the H level is applied to latch LT4 through OR gate OR20. The outputs of latches LT3 and LT3W are applied to the output control logic as state T3 and state T3W respectively. That is, if DC# is asserted in state T3 and T3W, then the H level is applied to latch LT4, and the H level is accepted according to the clock CLK.

The output circuit of latch LT4 is similar to the circuit in state T3. When DC# is negated, state T4W is reached, indicating a wait state, and the output of latch LT4W turns to the H level. When DC is asserted in either state T4 or T4W, the output of latch LT5 turns to the H level. This is controlled by AND gates AND21–AND24 and OR gates OR22 and OR23.

When the output from latch LT5 turns to the H level, the output of AND gate AND25 turns to the H level if DC# is negate. Then, the output of latch LT5W turns to the H level through OR gate OR24, thereby reaching state T5W. Since AND gate AND26 retains the H level as long as DC# is negated, the input to latch LT5W indicates the H level. More specifically, state T5W is held. If DC# is asserted in state T5, the output from AND gate AND27 turns to the H level.

When state T5 or T5W is retained, the output of AND gate AND28 turns to the H level if DC# is asserted MREQ# is negated, and a bus access request is issued. At this time, the H level is applied to latch LT1 through OR gate OR14. The output of AND gate AND29 turns to the H level when DC# and MREQ# are asserted in state T5 and T5W. The output of AND gate AND30 turns to the H level when DC# is asserted and a bus access request is not issued in state T5 or T5W. At this time, the H level is applied to latch LTi through OR gate OR15 (shown in FIG. 9), and state Ti is reached.

Based on the state conditions described above, a state is stored in each latch. In each state, target sequence control can be performed.

Figure 11:
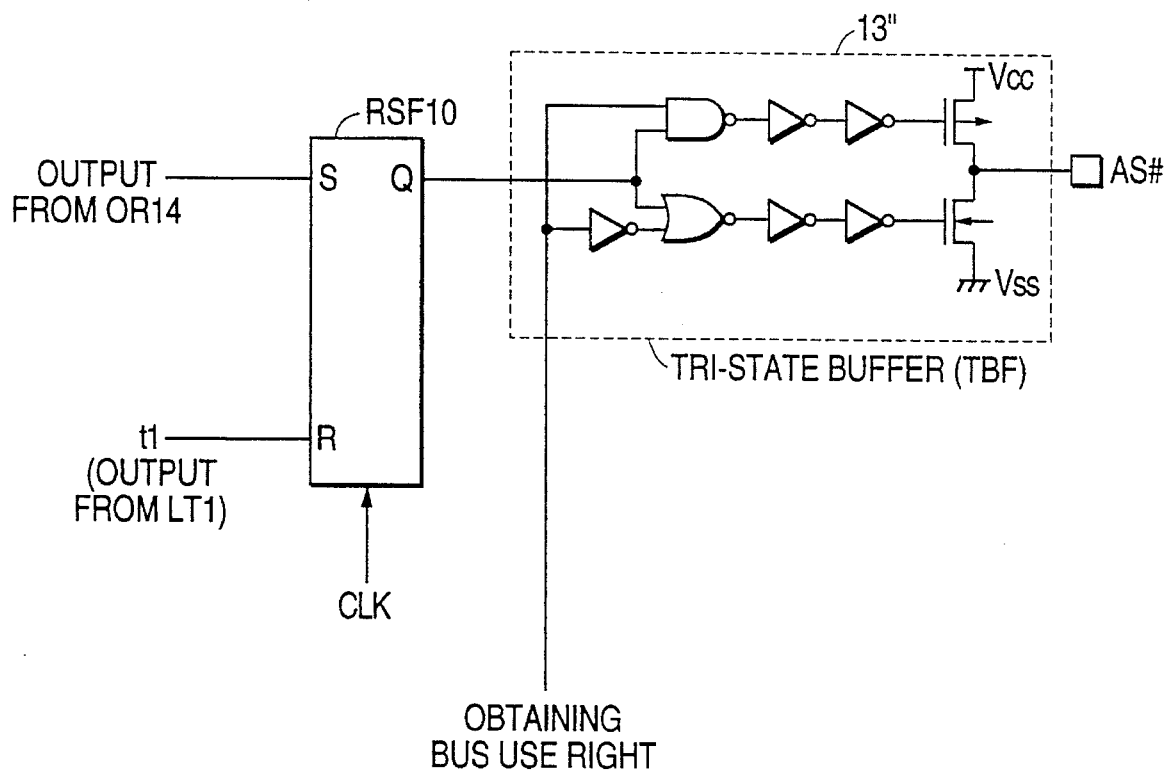
FIG. 11 shows the strobe signal output circuit for generating a strobe signal (AS#)

FIG. 11 shows the output circuit which generates the strobe signal AS#. A set/reset flip-flop RSF10 is set when the state machine changes the state to T1, and reset when state T1 is reached. That is, the set signal to be applied to the set/reset flip-flop RSF10 is the output from OR gate OR14 which is applied to T1, and the reset signal is the output from latch LT1. That is, if a bus use right is obtained, then the H level is applied to the tri-state buffer TBF and the output from the flip-flop RSF10 is outputted as the AS# signal.

Figure 12:
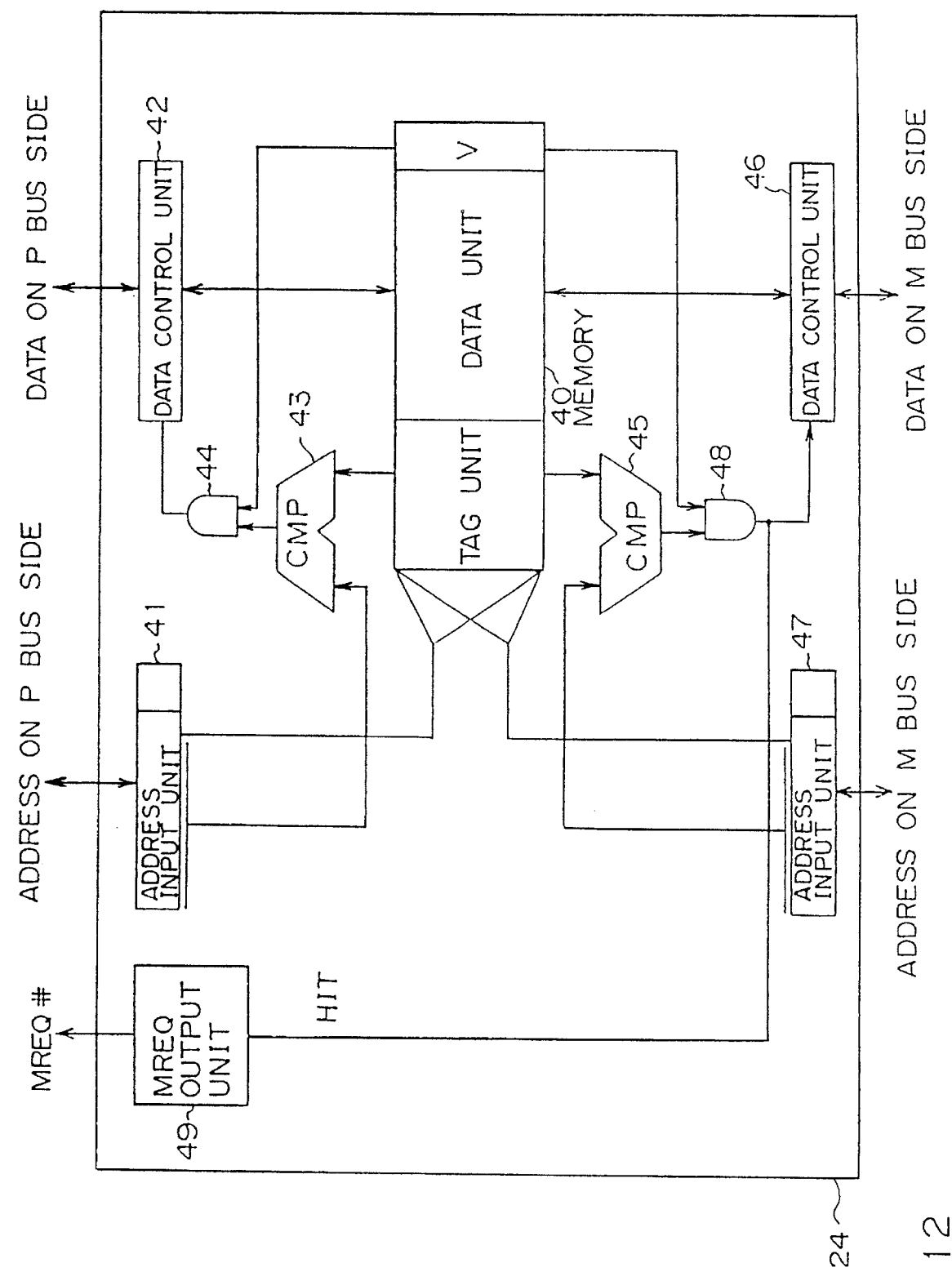
FIG. 12 shows the configuration of the secondary cache memory block.

FIG. 12 shows the configuration of the secondary cache memory.

The secondary cache memory comprises a memory 40 have a tag unit, a data unit, and a V (valid) bit unit; a P bus side circuit; an M bus side circuit and a control circuit. The memory 40 is a dual port memory having two input/output ports and two address ports.

An address input unit 41 on the P bus side is connected to the P bus, and all bits are applied to the tag unit of the memory 40. Data in the data unit are accessed through the tag unit. The tag unit stores the location in which the address of a memory area managed by the central processing unit 22 is stored. The data unit is accessed according to an address applied by the address input unit 41 and converted to the address in the data unit in the memory 40.

As described above, the memory 40 is a dual port memory. One port is connected to the data bus of the P bus 28 through the data control unit 42. The data control unit 42 connects the P bus and the data unit of the memory 40 for two-way communication, and permitting two-way communication if valid target data exists in the memory 40 (the value in the V bit unit is 1). The connection is controlled by a comparator (CMP) 43 and AND gate 44. A plurality of higher order address bits applied through the address input unit 41 are applied to one input of the comparator 43.

To the other input of the comparator 43, the output from the tag unit in the memory 40 is applied. If the tag unit stores the location in which the data to be accessed is stored, it outputs the higher order addresses. Therefore, the comparator 43 outputs 1. If, at this time, data in the data unit are valid, then V bit unit outputs 1. Accordingly, the AND gate 44 which receives this output, also outputs 1. The data control unit 42 performs the two-way connection.

Circuits similar to those described above are connected to the other port of the memory 40 including a comparator 45, a data control unit 46, an address input unit 47, and AND gate AND48, which all operate similarly to those described when accessed through the M bus 29.

The output from AND gate AND48 is connected to an MREQ# output unit 49. In addition to the above described operations, the comparator 45 always monitors the addresses on the M bus side. If an address is valid, that is, the output from the AND gate AND48, is "1", the control circuit sets the value of the V bit unit to 0 for the corresponding area, and the MREQ# output unit 49 outputs MREQ#. Furthermore, when a AS# signal is inputted, the address of the invalidated area is outputted to the address bus.

The memory accessing device 21 used with the system configuration shown in FIG. 4 accesses the secondary cache memory 24. The bus timing at this time can be:

(1) one bus access for one address output, or (2) the predetermined number of times of bus access for one address output.

(1) is referred to as a basic cycle, and (2) is referred to as a block transfer cycle. More specifically, (2) is a burst mode in which one address output incurs serial access for one line of the secondary cache memory 3.

Figure 13:
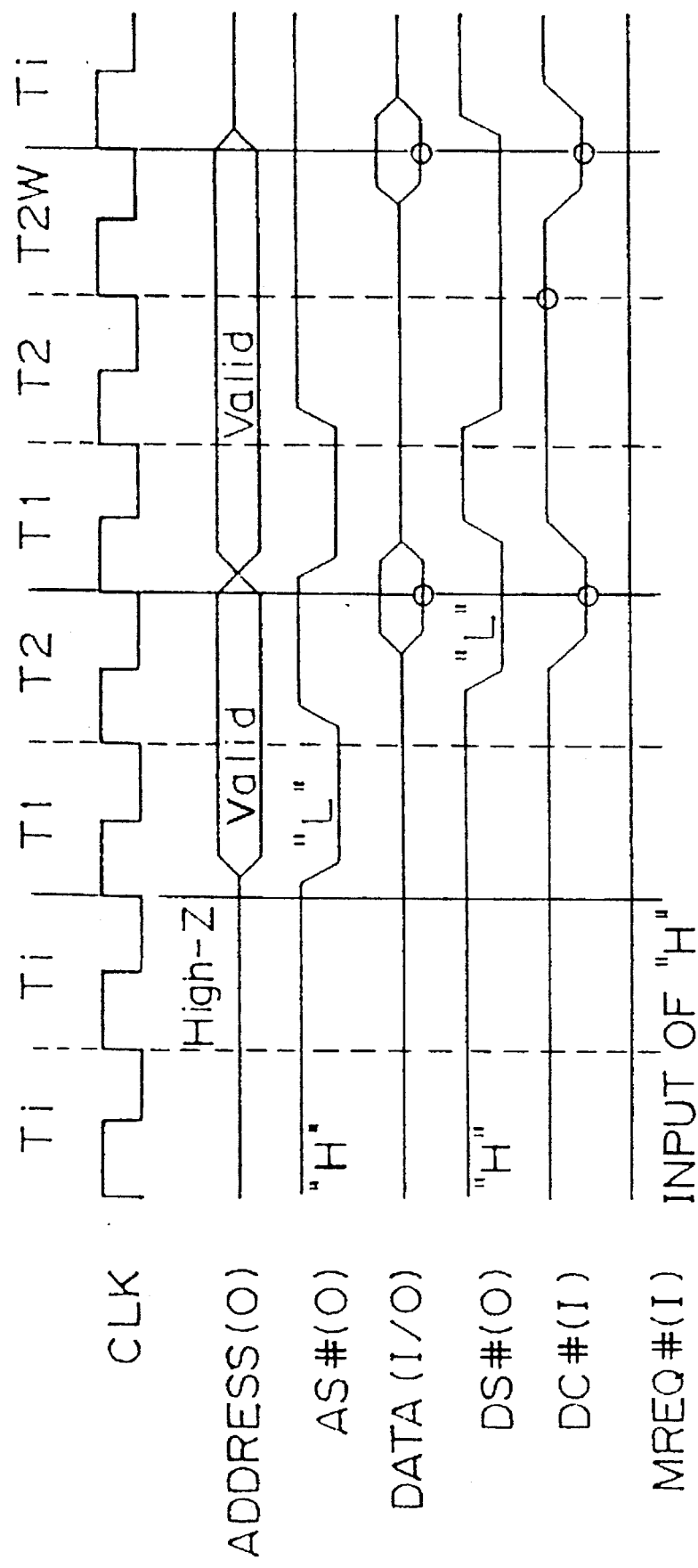
FIG. 13 is the timing chart of a basic cycle of the secondary cache memory.
Figure 14:
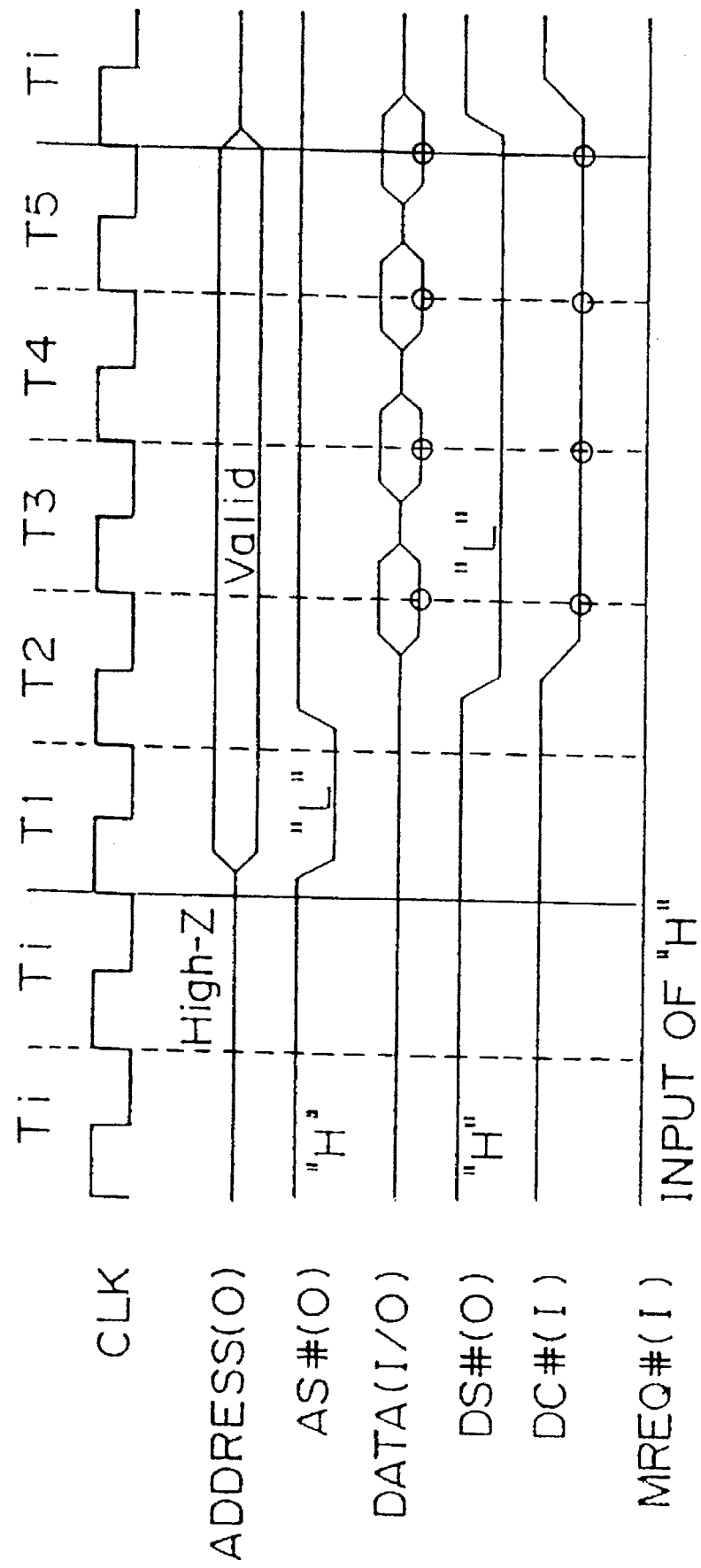
FIG. 14 is the timing chart of a block transfer cycle during accessing of the secondary cache memory.

The timing chart of the above described two types of bus timing is shown in FIGS. 13 and 14. The bus timing in these figures indicates a data read cycle in which one bus access contains two machine cycles. The block transfer shown in FIG. 14 indicates access to the bus four times, each access being a serial access.

In FIG. 14, a memory accessing device may enter states Ti, T1–T5, and T1W–T5W. State Ti indicates the idle state when nothing accesses the memory. CLK is a clock signal for driving the system.

ADDRESS (O) indicates an address output from the memory accessing device 21, "High-Z" indicates that the address output is floating in the high impedance state, and "valid" indicates that the address output outputs a valid value. AS# (O) is a strobe signal indicating whether the address on the P bus 28 is valid. A "L" level for this is a negative logic signal indicates a true value, i.e., the address is valid. In the signal notation, a signal name ending with "#" indicates a negative logic signal, and an "I" and a "O" enclosed by a pair of parentheses indicate an input signal and an output signal respectively.

DATA (I/O) indicates data input/output from the memory accessing device 21, and DS# (O) indicates a strobe signal which indicates that data on the P bus 28 are valid. DC# (I) is outputted from the memory and indicates completion of data access. The circles shown in FIGS. 13 and 14 indicate the timing at which each signal is detected.

With the system configuration shown in FIG. 4, because the above holds true with a control signal such as an address strobe signal AS# (O) and a data strobe signal DS# (O), the CPU 22 and the memory accessing device 21 may access the same secondary cache memory 24'. More specifically, if the bus use right is not obtained by other circuits, the CPU 22 outputs a similar signal through a bus. Accordingly, control signals are held in the high impedance state to prevent a bus conflict. Address ADDRESS (O) and data DATA (O) are also held in the high impedance state, unless addresses or data are being outputted, even if the bus use right is obtained.

The above described bus timing is changed according to an access completion signal DC# (O) from the cache memory side. If the access completion signal DC# (O) is not asserted, a wait state such as T2W state shown in FIG. 13 is reached, and the cycle is repeated. In FIGS. 9–10 and 14, unless an access completion signal DC# (O) is asserted in states T2, T3, T4, and T5, states T2W, T3W, T4W, and T5W are reached respectively, and the cycle is repeated until the access completion signal DC# (O) is asserted.

Figure 15:
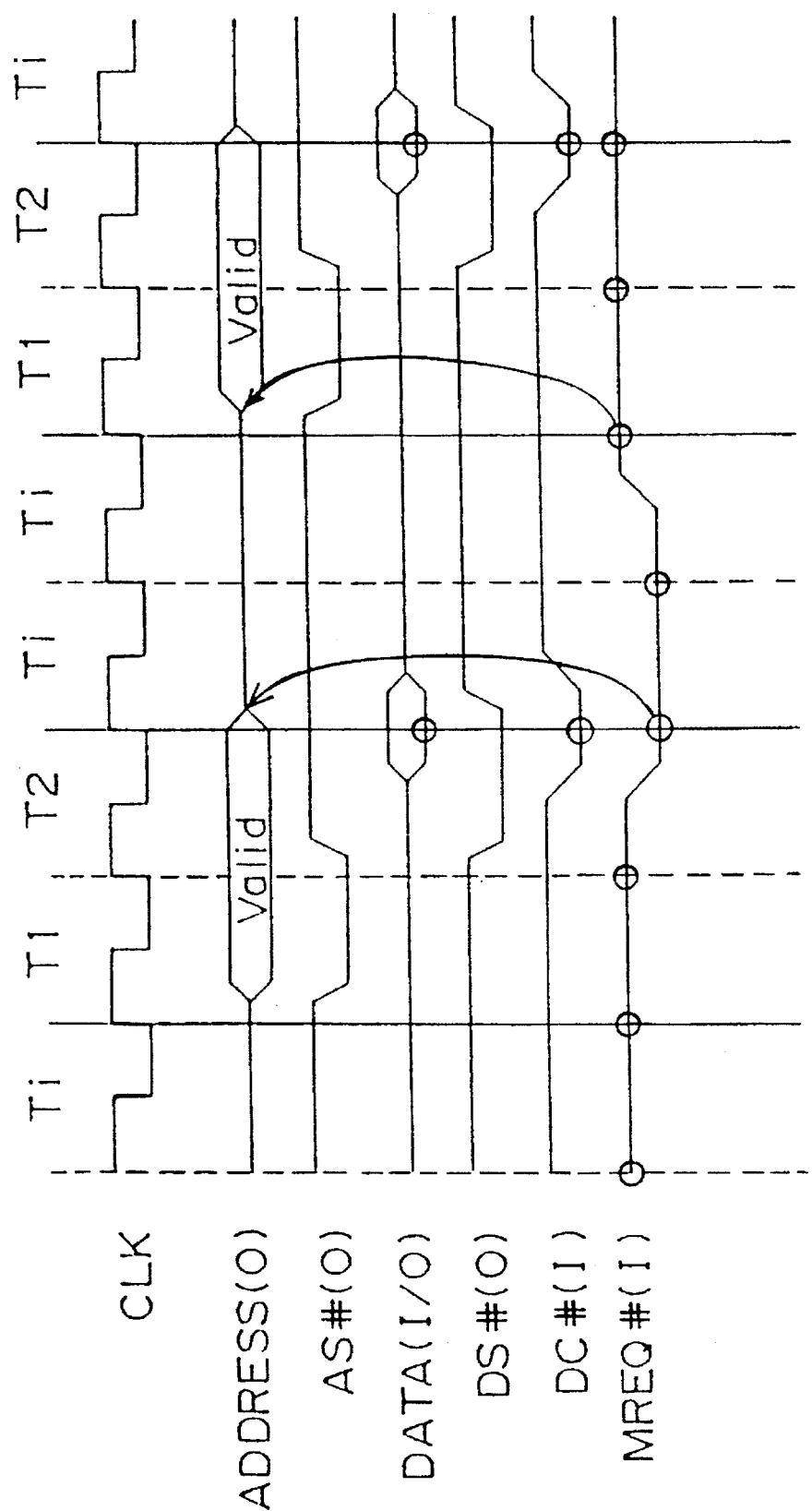
FIG. 15 is the timing chart of the basic cycle in which a monitor request signal (MREQ#) is detected in a cycle for outputting AS#.
Figure 16:
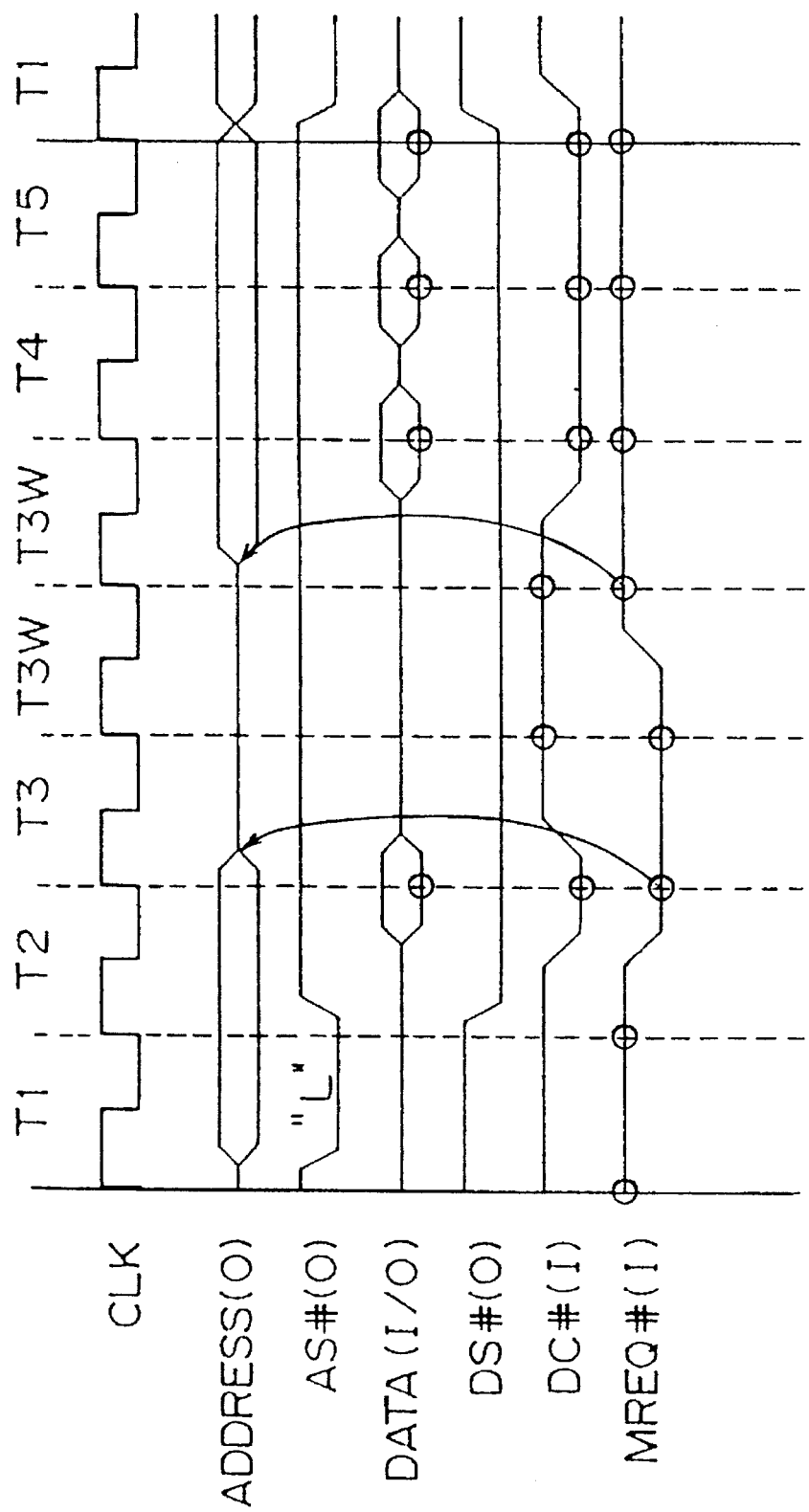
FIG. 16 is the timing chart of the block transfer cycle in which MREQ# is detracted during the bus cycle in accessing a memory.

FIGS. 15 and 16 are bus timing charts in which a memory accessing device obtains the bus use right.

FIG. 15 is a timing chart for a basic cycle in which a monitor request signal MREQ# is detected in a cycle for outputting an address strobe signal AS# (O). FIG. 16 is a timing chart for a block transfer cycle in which a monitor request signal MREQ# is detected during a bus cycle in accessing a memory.

In FIG. 15, a monitor request signal MREQ# is detected when the operation is entering the next basic cycle on completion of the basic cycle in states T1 and T2. The memory accessing device 21 enters the idle state, that is, state Ti, with the bus use right reserved, and sets address output ADDRESS (O) to the high impedance state. The memory accessing device remains in the idle state, state Ti, until the monitor request signal MREQ# is negated.

In FIG. 16, a monitor request signal MREQ# is detected in a block transfer cycle during the transition from state T2 to state T3. At this time, the access completion signal DC# (I) is asserted, and the memory accessing device 21 receives, from DATA (I/O), the data accessed by the address output ADDRESS (O) in state T1 and enters state T3 with the address output ADDRESS (O) set in the high impedance state. Next, since the access completion DC# (I) is negated at the end of the cycle in state T3, the wait state T3W is reached. If the monitor request signal MREQ# is negated, the value of the address output ADDRESS (O) is recognized as valid, and the access completion signal DC# (I) is asserted at the end of the present state T3W. Thus, the operation enters the next state T4.

Figure 17:
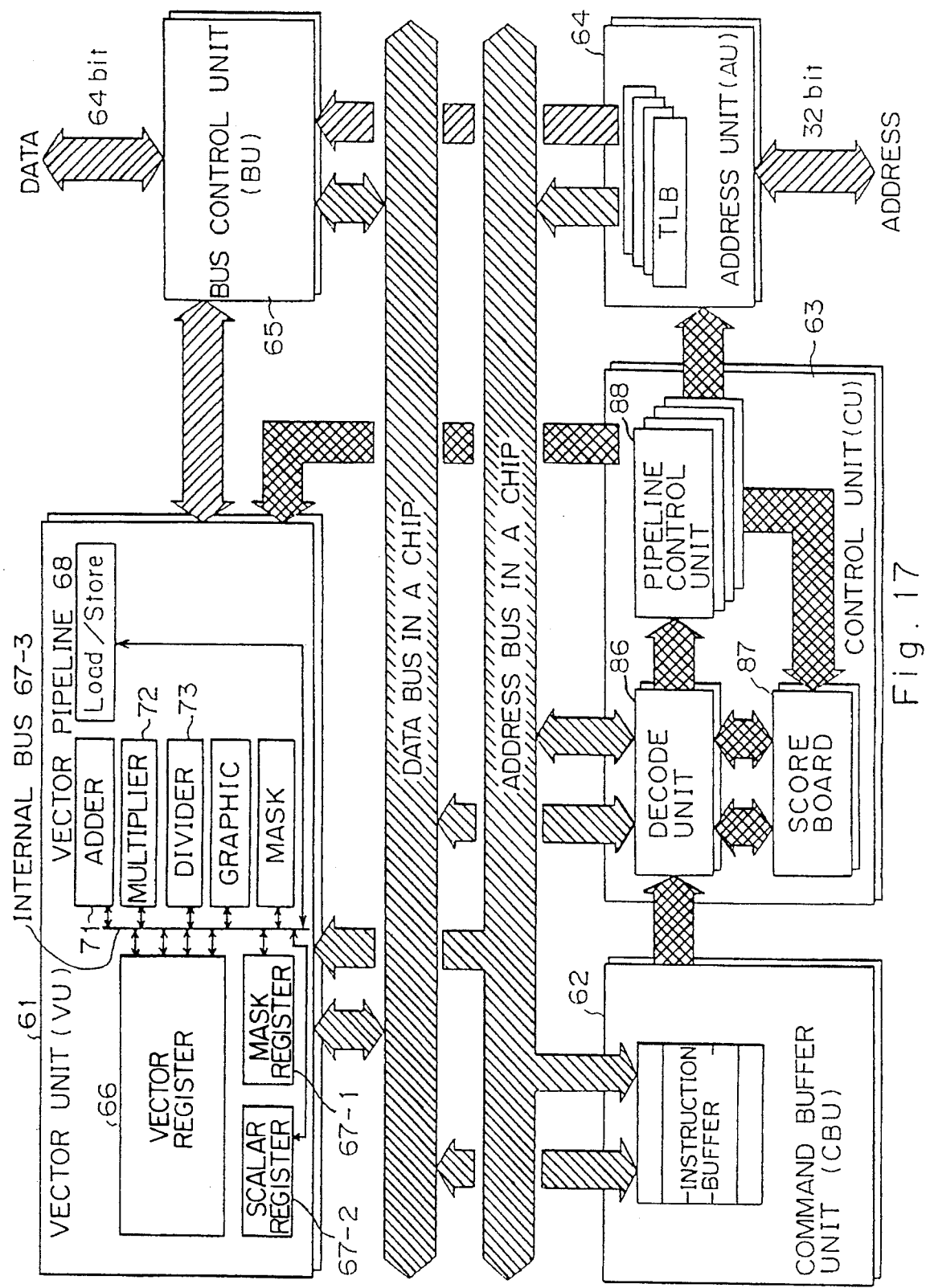
FIG. 17 shows the configuration of the vector processor unit.

FIG. 17 shows the configuration of the vector process unit (VPU).

The vector processor unit (VPU) comprises a vector unit (VU) 61, a command buffer unit (CBU) 62, a control unit (CU) 63, an address unit (AU) 64, and a bus control unit (BU) 65. The control circuit 13 in the memory accessing device 21 shown in FIG. 4 comprises the above mentioned vector unit 61, the command buffer unit 62, the control unit 63, and the bus control unit 64.

The address unit 64 refers to the output address generating circuit 11, the output latch unit 14, the tri-state buffer 15, and the buffer control unit 12'.

The vector unit 61 performs a vector operation and comprises an 8 kilobytes (KB) vector register (VR) 66, a 64-byte mask register (MR) 67-1, a 128-byte scalar register (SR) 67-2, and vector pipelines 68 for load/store "pipes" for storing data in and reading data from adders 71, multipliers 72, dividers 73, graphics processors, mask processors, and registers, and is connected by internal bus 6-3. The vector unit 61 is the important part of the vector processor unit.

The central processing unit 22, that is, the CPU, and the vector processor unit VPU, that is, the arithmetic operation unit 27 shown in FIG. 4 are connected to each other through a slave interface. The central processing unit 22 accesses the vector processor unit with the following procedure when it requests that a vector operation, etc. be performed.

First, the central processing unit 22 initializes registers, described later, such as internal registers in the vector processor unit, for example, vector length registers. On completion of the initialization, it activates the vector processor unit, and the vector processor unit performs target operations in parallel and in a pipeline process. At this time, the primary cache memory 23' in the central processing unit 22 is accessed.

On completion of the above described operations, the central processing unit 22 accesses the registers in the vector processor unit, reads the completion state, and determines, for example, whether the operations were completed normally.

Figure 18:
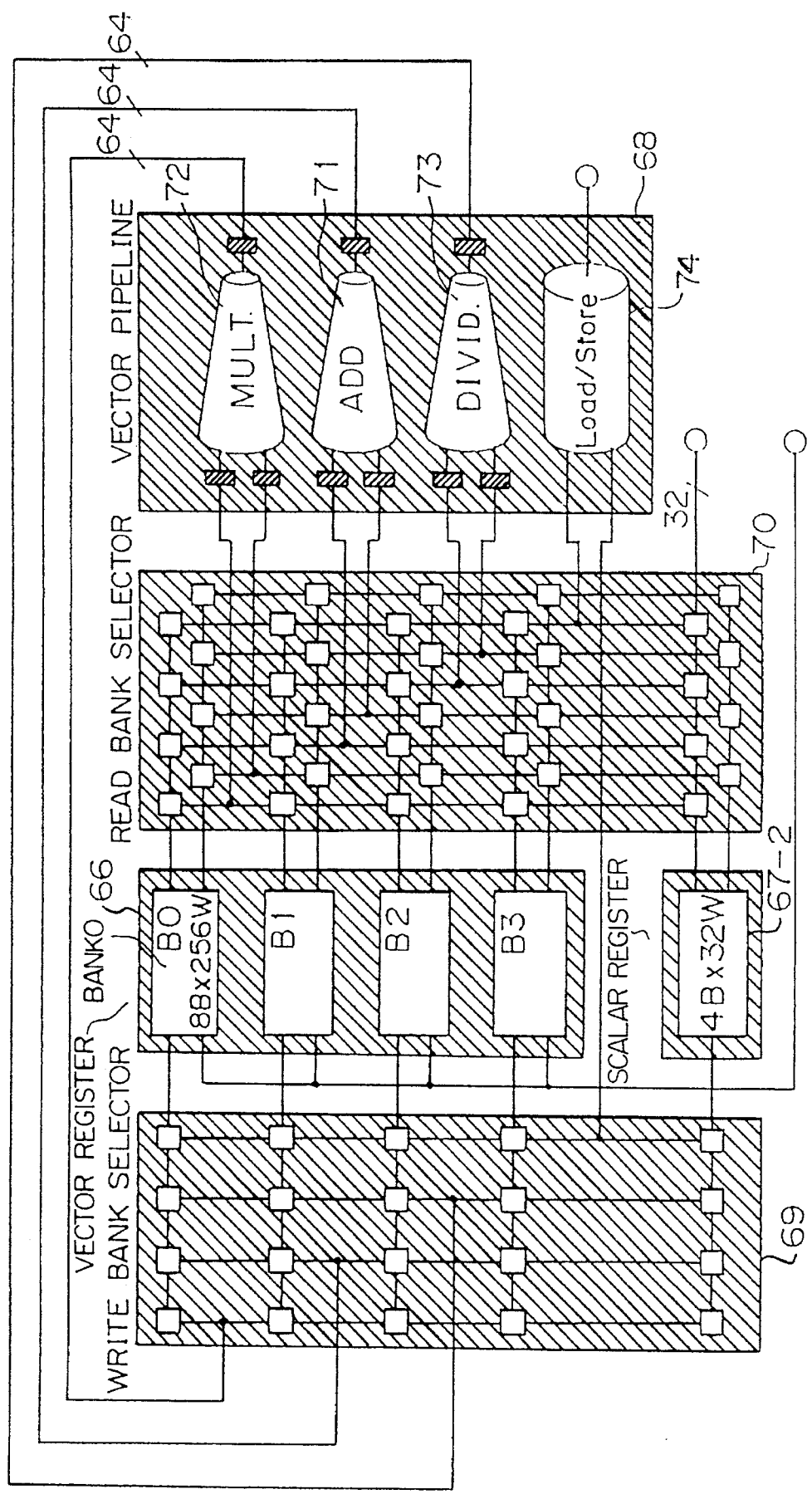
FIG. 18 shows the configuration of a vector unit in the vector processor unit.

FIG. 18 shows in detail the configuration of the portion of the vector unit 61 associated with a vector operation. Each of banks B0, B1, B2, and B3 of the vector register (VR) 66 comprises 8 bytes (64 bits)×256 words, and the output is applied to a read bank selector 70. The read bank selector 70 comprises m input terminals each comprising 64 bits and 8 output terminals where m is an integer. For example, the read back selector 70 may comprise each comprising 64 bits 10 output terminals and 8 output terminals. It is matrix-structure circuit for optionally determining which input data is to be outputted to which output terminal. Additionally, an address in the primary cache memory associated with the input and output of the data is outputted by the address unit 64 in FIG. 7. That is, the primary cache memory is accessed according to the address outputted by the memory accessing device 21. The input data selected by the read bank selector 70 are applied in units of 64 bits×2 ports to a multiplier (MUL) 72, an adder (ADD) 71, and a divider (DIV) 73, each forming part of the vector pipeline 68. the multiplier 71, the adder 72, and the divider 73 of the vector pipelines 68 are configured such that arithmetic operations are performed in a pipeline process.

The results of operation pipeline processes are applied to a write bank selector 69. The write bank selector 69 comprises i input terminals, each comprising 64 bits and j output terminals, each comprising 64 bits where i and j are integers. Some of the output terminals are applied to the vector registers 66. The write bank selector 69 is matrix-structured, and optionally selects and outputs the data inputted to the input terminals.

For example, 4 input terminals and 5 output terminals are provided.

With the above described configuration, the value outputted by the vector register is applied to each vector pipeline through the read bank selector. The operation result is returned to the vector register through the write bank selector. Thus, an arithmetic operation can be performed.

Then, the load/store pipe 74 is connected to the input unit of the write bank selector and the output unit of the read bank selector, and is further connected to the bus control unit 65 (FIG. 17). Thus, operation data are transmitted from external memories to the vector register and from the vector register to external memories.

The outputs of the write bank selector 69 are applied to the scalar register (SR) 67-2, and the outputs are input to the read bank selector 70. Then, one output of the read bank selector 70, for example, 32 bits, is outputted as an address index.

The load and store data of the above described vector operation operand are transmitted through the bus control unit 65 connected to the load and store pipes.

Figure 19:
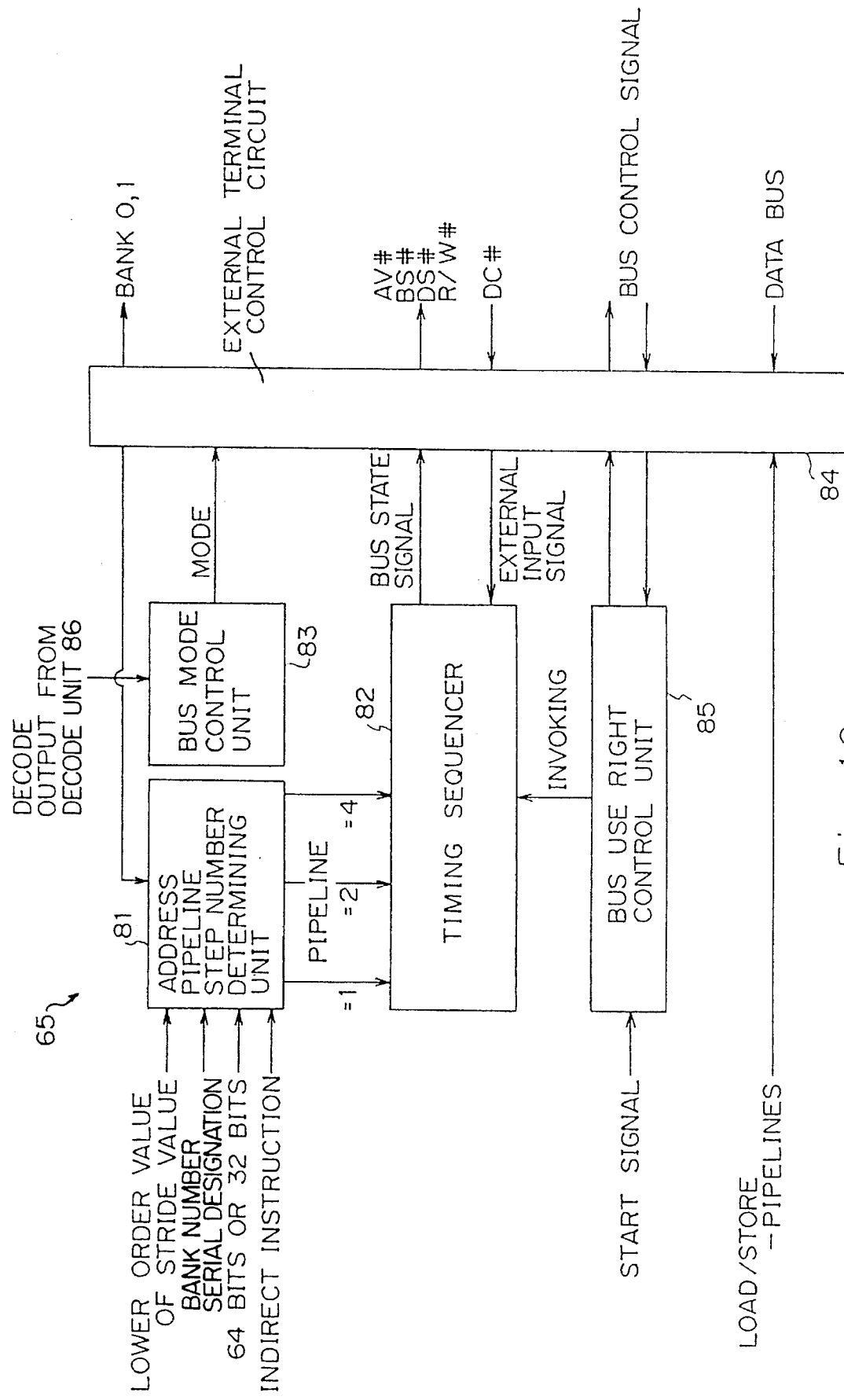
FIG. 19 shows the configuration of a bus control unit in the vector processor unit.

FIG. 19 shows the configuration of the bus control unit 65. The bus control unit 65 is a circuit for controlling the interface to an external storage unit. An address pipeline step number determining unit 81 is a logic circuit for determining the number of addresses to be outputted first, according to 32/64 bit operand length, a stride value, and banks B0 and B1. Signals for the lower order value of a stride value, a bank number serial address designation bit, the 64/32 bit designation, and the indirect instruction are applied to the address pipeline step number determining unit 81. Then, the number of addresses to be outputted is determined, and the value is outputted to a timing sequencer 82.

The timing sequencer 82 is similar to the state machine 13', and controls the state of a bus. The number of states of a bus is determined according to the number of pipelines outputted by the address pipeline step number determining unit 81, and bus state signals are converted according to external input signals and timing signals applied through an external terminal control circuit 84.

The decode output from a decode unit 86 of the control unit 63 (FIG. 17) is applied to a bus mode control unit 83, and the bus mode control unit 83 determine the mode of each bus cycle, for example, load, store, etc., according to an instruction. Then, the timing sequencer 82 and the bus mode control unit 83 control the external output terminals of AV#, BS#, DS#, R/W# and DC#.

The external terminal control unit 84 controls external inputs, outputs, whether the input/output terminals are to receive input or supply outputs, and also controls output timings, according to a bus state signal and external input signals.

The bus use right control unit 85 controls the acquisition of an external bus use right.

The external terminal control unit 84 controls an external circuit, for example, a memory, through the above described external bus when it obtains the bus use right under control of the bus use right control unit 85. Thus, vector data are transmitted between a vector register and an external memory.

If MREQ# is received from the secondary cache memory 24' when data are transmitted between a vector register and an external memory, that is, the primary cache memory 23', the timing sequencer 82 controls the state of the bus and outputs an address strobe signal AS#. The bus is temporarily released in response to the address strobe signal, and the secondary cache memory 2' notifies the primary cache memory 23' of the invalidation of the data.

Figure 20:
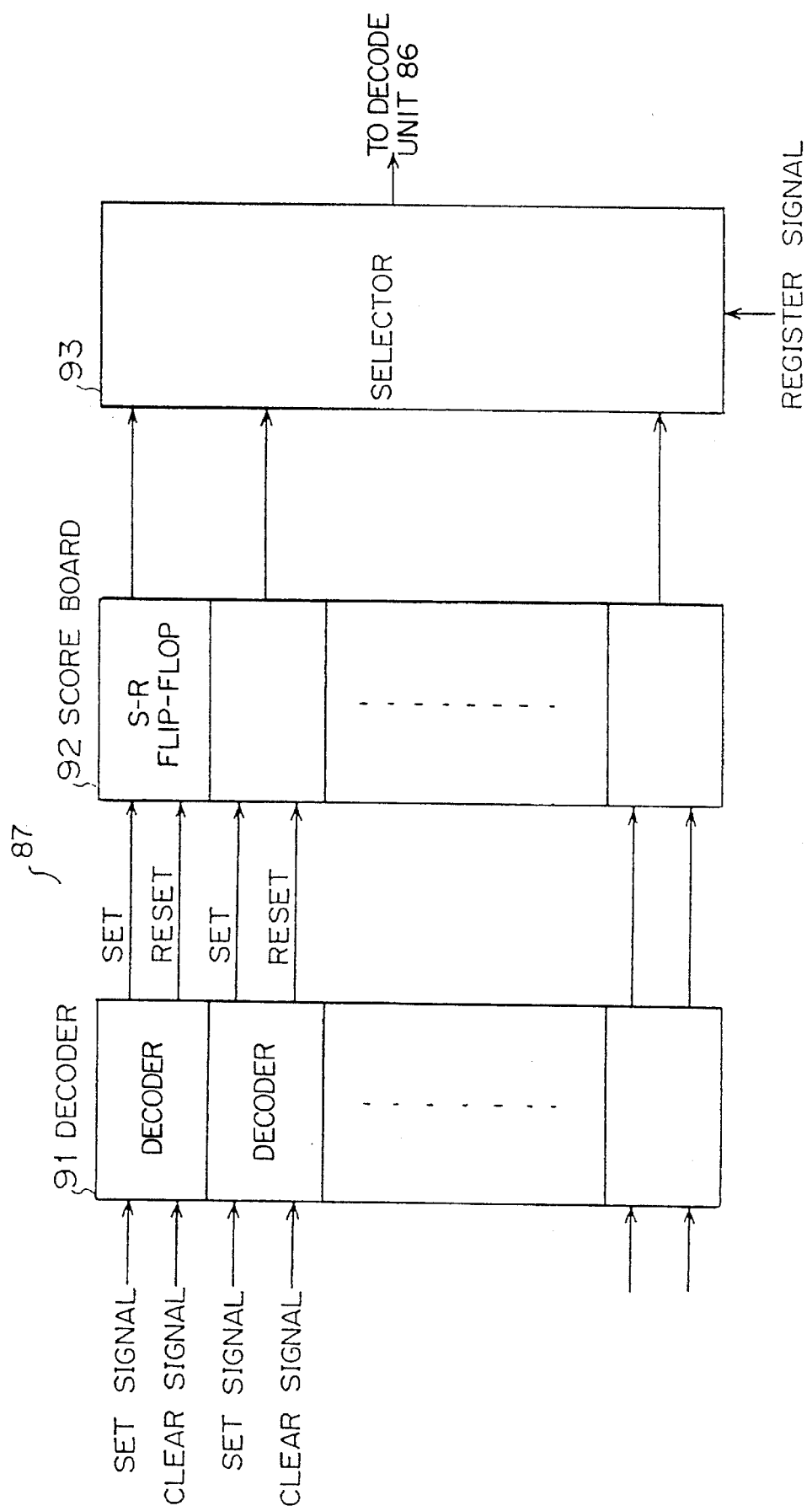
FIG. 20 shows the configuration of a score board in the vector processor unit.

FIG. 20 shows the configuration of a score board 87 (FIG. 17) provided in the control unit 63 (FIG. 17). The score board 87 comprises a decoder 91 for generating, according to each instruction, a SET signal which sets the number of a register to be used (each register is assigned a number) and a RESET signal for resetting the SET signal after the register is used and released; a score board 92 comprising a plurality of SRFPs (set/reset flip-flops) for storing the states of set/reset signals; and a selector 93 for receiving a read register number, and outputting the storage state of the second score board 92 corresponding to the register number specified by the read register number. The score board 87 checks the conflict between registers specified in executing pipelines in parallel. Before the execution of the instructions, the registers are specified and the corresponding register numbers are applied to the score board 87 as set numbers. The decoder 91 decodes the set numbers to determine, based on the set numbers, whether the specified registers are its own registers. Each decoding unit of the decoder 91 decodes each register number including the states "set" and "clear". If a decoder unit receives a set number (as indicated by the SET signal) of one of its own registers, it outputs a SET signal for that register.

When it receives a clear number (as indicated by the CLEAR signal) of its own register, it outputs a RESET signal for the register. The state of an SRFF is changed according to the set and the reset signals, and the state of the registers are stored. For example, if a register is to be used, then its set number is applied to the decoder 91, the set number of the register is outputted as the SET signal, and the SRFF of the second score board 92 is set. This state indicates that an instruction being executed is using the register. Then, a clear number (CLEAR signal) is outputted on completion of the execution, the respective decoding unit in decoder 91 decodes the number and outputs a respective reset signal, and the SRFF of the second score board 92 is reset. In this state, that is, when the SRFF is reset, the corresponding register is not being used.

Figure 21:
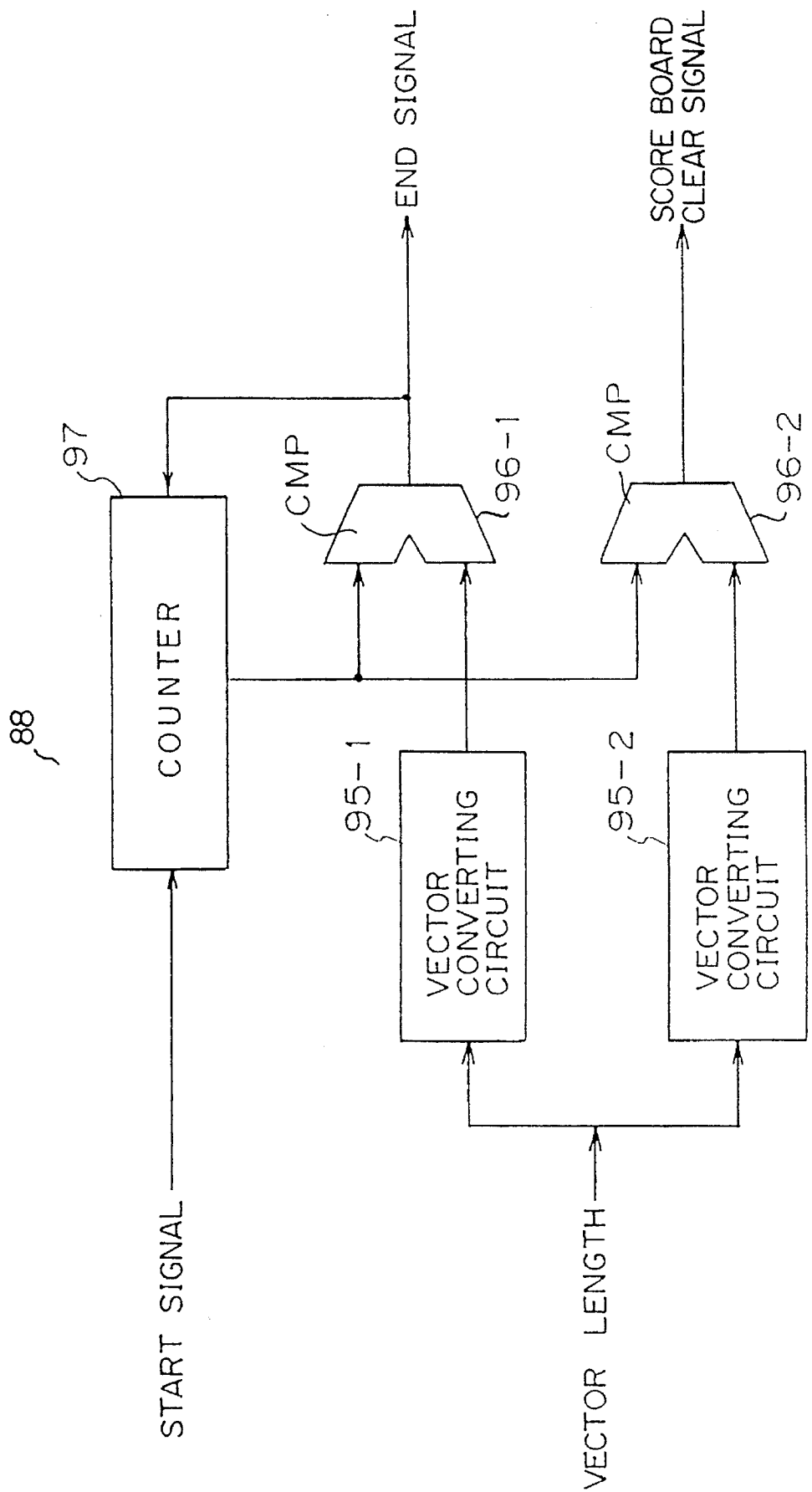
FIG. 21 shows the configuration of a pipeline control unit in the vector processor unit.

FIG. 21 shows the configuration of a pipeline control unit 88 (FIG. 17) of the vector processor unit. The pipeline control unit 88 generates activation signals, that is, start instructions, to pipelines such as multiplier (MLT) pipelines, adder (ADD) pipelines, termination signals, i.e., END signals to pipelines according to vector length data (the number "i"), and score board clear signals issued when registers, etc. enter a conflict.

Vector converting circuits 95-1 and 95-2 are logic circuits for converting signals indicating vector length according to the signals indicating vector length, to those in the format of the internal control timing. The output from the vector converting circuits 95-1 and 95-2 are applied to comparators 96-1 and 96-2, respectively.

A counter 97 generates, according to a vector length and a counter value, a signal having an end timing of each pipeline (END signal) and a score board clear number (CLEAR signal as shown in FIG. 20). When the counter 97 receives a start signal, it starts counting a clock. The count value is applied to the other input terminals of comparators 96-1 and 96-2. Comparator 96-2 outputs a score board clear signal (i.e., CLEAR signal as shown in FIG. 20) when the count value matches the value converted from the vector length by vector converting circuit 95-2. The counting operation is performed and an END signal is outputted by comparator 96-1 when the count value matches the value converted from the vector length by vector length converting circuit 95-1. The END signal is also applied to the stop input terminal of the counter 97, and according to this signal, the counter 97 stops the counting operation.

As described above, in the present invention, the output control unit controls such that the output from the address generating circuit enters the high impedance state if a request for access to the first buffer storage unit is issued by the second buffer storage unit when the memory accessing device obtains the bus use right of the first bus. Therefore, to maintain consistency between the cache memory and the main storage unit, the address output from the memory accessing device is held in the high impedance state even if the bus use right is obtained by the memory accessing device when the secondary cache memory issues to the primary cache memory a request for the invalidation of a cache memory entry. Thus, even if the secondary cache memory outputs, to the primary cache memory through the P bus, an address according to which a cache memory entry is to be invalidated, bus conflicts do not arise and a memory accessing device capable of maintaining consistency at a high speed between the primary and the secondary cache memories and the main storage unit can be successfully realized.

Furthermore, in the memory accessing device of the present invention, the secondary cache memory invalidates a cache memory entry for the primary cache memory without releasing the bus use right. Therefore, it does not require bus arbitration such as bus use right acquisition performed by the central processing unit, bus use right release performed by the memory accessing device, etc. As a result, a high performance system can be configured.

In addition insignificant processes, for example, use of the contents of the primary cache memory by the central processing units without maintaining consistency between the main storage unit and the primary and secondary cache memories, can be prevented.

What is claimed is:

1. A memory accessing device coupled to a first bus which couples to a first buffer storage in a central processing unit to a second buffer storage, said memory accessing device accessing at least one of said first buffer storage and said second buffer storage independently of said central processing unit, using said first bus, said memory accessing device comprising:

address generating means for generating an address, the address being used to determine which of said first buffer storage and said second buffer storage is accessed, and output control means having an output for outputting said address to said first bus when the memory accessing device has obtained a right to use said first bus, and for controlling the outputting of said address to said first bus such that the output to said first bus enters an idle state if said second buffer storage issues a request for access to said first buffer storage.

2. The memory accessing device according to claim 1, wherein said memory accessing device is coupled to a main storage unit, wherein said first buffer storage and said second buffer storage are cache memories of said central processing unit, and wherein said second buffer storage outputs an access request to said first buffer storage to invalidate a cache memory entry in said first buffer storage and to maintain consistency between the main storage unit and said first and second buffer storage.

3. The memory accessing device according to claim 1, wherein said idle state is indicative that an output from said output control means to said first bus is in a high impedance state.

4. The memory accessing device according to claim 3, wherein said output control means comprises:

a latch for temporarily storing addresses outputted from said address generating means;

a tri-state buffer for receiving an address from said latch and outputting the address received from said latch to said first bus or holding the output of said latch in the high impedance state; and buffer control means for controlling said tri-state buffer and causing said tri-state buffer to output to said first bus the address received from said latch during normal access and to hold the output of said latch in the high impedance state during said idle state.

5. The memory accessing device according to claim 1, further comprising:

bus use right control means comprising a state machine for controlling a state change in said memory accessing device and a strobe signal output means for generating a strobe signal indicative of whether the address generated by said address generating means is valid.

6. The memory accessing device according to claim 5, wherein:

said bus use right control means issues, to said central processing unit, a bus use right request signal when a right to use the first bus is requested by said memory accessing device;

said central processing unit issues, to said bus use right control means of said memory accessing device, a bus use right response signal indicating whether said memory accessing device can obtain the first bus, wherein said memory accessing device obtains the first bus based on the bus use right response signal issued to said bus use right control means.

7. An arithmetic operation unit coupled to a first bus which couples a first buffer storage in a central processing unit to a second buffer storage, said arithmetic operation unit performing an arithmetic operation which produces an operation result, independently of said central processing unit, said arithmetic operation unit comprising:

a memory accessing device for accessing at least one of said first buffer storage and said second buffer storage independently of said central processing unit, said memory accessing device comprising:

address generating means for generating an address, the address being used to determine which of said first buffer storage said second buffer storage is accessed; and output control means for outputting said address to said first bus when the memory accessing device has obtained a right to use said first bus, and for controlling the outputting of said address to said first bus sush that the output to said first bus enters an idle state if said second buffer storage issues a request for access to said first buffer storage, said address generating means generating at least one of an address of read data required for performing an arithmetic operation and an address at which the operation result is stored.

8. The arithmetic operation unit according to claim 7, wherein said arithmetic operation unit is a vector processor unit.

9. The arithmetic operation unit according to claim 8, wherein said vector processor unit performs an arithmetic operation using a pipeline process.

* * * * *

UNITED STATES PATENT AND TRADEMARK OFFICE
CERTIFICATE OF CORRECTION

PATENT NO. : 5,551,010
DATED : August 27, 1996
INVENTOR(S) : Hideyuki IINO et al.

It is certified that error appears in the above-indentified patent and that said Letters Patent is hereby corrected as shown below:

On the title page item 56, insert the following:

-- FOREIGN PATENT DOCUMENTS 0 387 644   9/1990   Europe 0 206 321   12/1986   Europe

OTHER PUBLICATIONS

"A VLSI Processor for HP Precision Architecture," S. Mangelsdorf et al., Hewlett-Packard Journal, Vol. 38, No. 9, September 1987, Palo Alto, California, pp 4-17.--.

UNITED STATES PATENT AND TRADEMARK OFFICE
CERTIFICATE OF CORRECTION

PATENT NO. : 5,551,010  Page 2 of 4
DATED : August 27, 1996
INVENTOR(S) : Hideyuki IINO et al.

It is certified that error appears in the above-indentified patent and that said Letters Patent is hereby corrected as shown below:

In the Abstract, Item [57], line 12, after "the" insert --output-- and change "enter" to --enters--.

Column 3, line 61, delete "of in understanding the principle".

Column 5, line 18, after "a" insert --signal--.

Column 6, line 16, "2" should be --22--; and

Column 11, line 30, "TSW" should be --T5W--; and lines 59 and 62, ""(I)" should be --"(I)"--. both occurrence

UNITED STATES PATENT AND TRADEMARK OFFICE
CERTIFICATE OF CORRECTION

PATENT NO. : 5,551,010          Page 3 of 4
DATED : August 27, 1996
INVENTOR(S) : Hideyuki IINO et al.

It is certified that error appears in the above-indentified patent and that said Letters Patent is hereby corrected as shown below:

Column 12, line 43, after "10" insert --,--, line 45, "and" should be --obtained and --, line 55, "LTi" should be --LT1--.

Column 13, line 18, after "T2W" insert --,--;

line 54, "DC" should be --DC#--;

line 60, "negate" should be --negated--; and line 67, after "asserted" insert --,--.

Column 15, line 25, delete "is a".

Column 16, line 65, after "terminals" insert --,--;

line 66, after "terminals" insert --, each comprising 64 bits,--; and line 67, delete "each comprising 64 bits".

UNITED STATES PATENT AND TRADEMARK OFFICE
CERTIFICATE OF CORRECTION

PATENT NO. :  5,551,010         Page 4 of 4
DATED      :  August 27, 1996
INVENTOR(S) : Hideyuki IINO et al.

It is certified that error appears in the above-indentified patent and that said Letters Patent is hereby corrected as shown below:

Column 17, line 1, "output" (first occurrence) should be --input--; and line 18, after "bits" insert --,--.

Column 20, line 55, "said" begins a new paragraph.

Column 21, line 5, after "means" insert --having an output--; and line 9, "sush" should be --such--.

Signed and Sealed this

Seventh Day of January, 1997

Attest:

BRUCE LEHMAN

*Attesting Officer*    *Commissioner of Patents and Trademarks*